May 3, 1960 J. F. DONAN ET AL 2,935,734

MEMORY SELECTING SYSTEM

Filed Aug. 17, 1954 12 Sheets-Sheet 1

INVENTORS:
John F. Donan
Daniel J. Daugherty
Willis E. Dobbins

By Carl Berst
Louis A. Kline
John T. Matlago, Agent

Their Attorneys

May 3, 1960

J. F. DONAN ET AL 2,935,734

MEMORY SELECTING SYSTEM

Filed Aug. 17, 1954

12 Sheets-Sheet 2

INVENTORS:
John F. Donan
Daniel J. Daugherty
Willis E. Dobbins

By Carl Beust
Louis A Kline
John T. Matlago, Agent
Their Attorneys

INVENTORS:
John F. Donan
Daniel J. Daugherty
Willis E. Dobbins
By Carl Beust
Louis A. Kline
John T. Matlago, Agent
Their Attorneys

Fig. 7

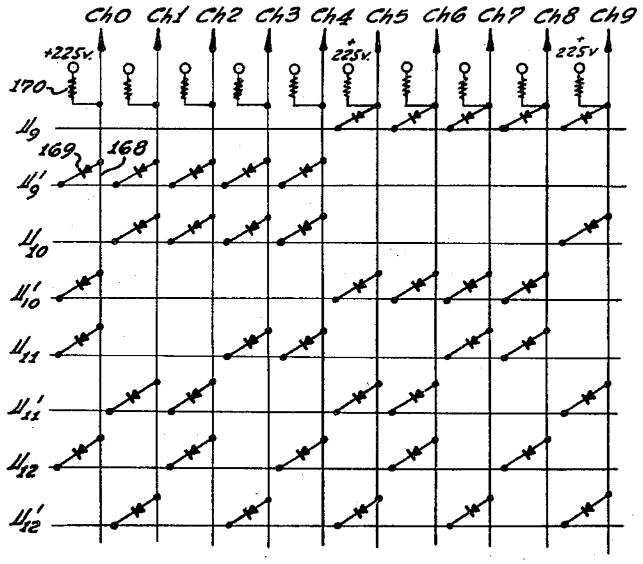

Fig. 8

| FLIP-FLOPS | | | | |
|---|---|---|---|---|
| U9 | U10 | U11 | U12 | |
| 0 | 0 | 1 | 1 | $Ch0 = U_9' U_{10}' U_{11} U_{12}$ |
| 0 | 1 | 0 | 0 | $Ch1 = U_9' U_{10} U_{11}' U_{12}'$ |
| 0 | 1 | 0 | 1 | $Ch2 = U_9' U_{10} U_{11}' U_{12}$ |
| 0 | 1 | 1 | 0 | $Ch3 = U_9' U_{10} U_{11} U_{12}'$ |
| 0 | 1 | 1 | 1 | $Ch4 = U_9' U_{10} U_{11} U_{12}$ |
| 1 | 0 | 0 | 0 | $Ch5 = U_9 U_{10}' U_{11}' U_{12}'$ |
| 1 | 0 | 0 | 1 | $Ch6 = U_9 U_{10}' U_{11}' U_{12}$ |
| 1 | 0 | 1 | 0 | $Ch7 = U_9 U_{10}' U_{11} U_{12}'$ |
| 1 | 0 | 1 | 1 | $Ch8 = U_9 U_{10}' U_{11} U_{12}$ |
| 1 | 1 | 0 | 0 | $Ch9 = U_9 U_{10} U_{11}' U_{12}'$ |

Fig. 9

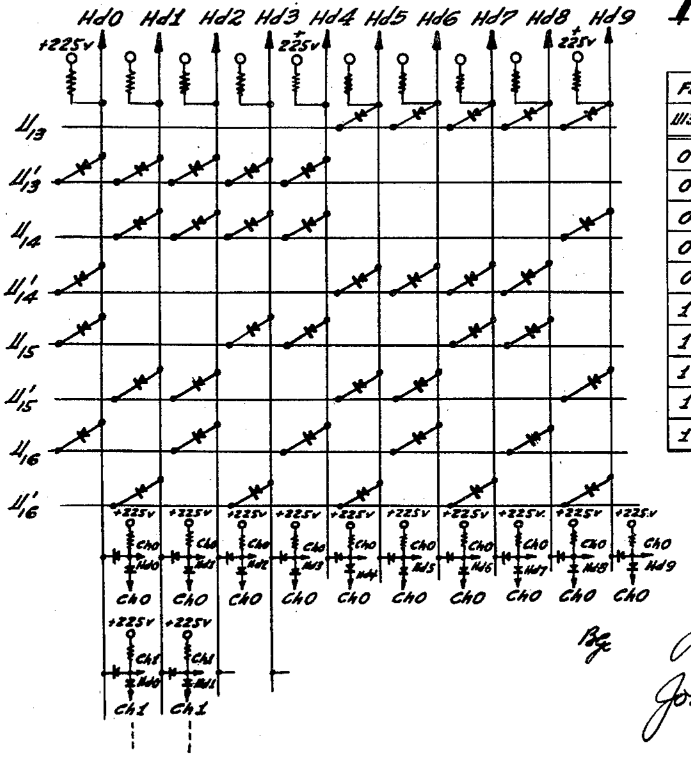

Fig. 10

| FLIP-FLOPS | | | | |
|---|---|---|---|---|
| U13 | U14 | U15 | U16 | |
| 0 | 0 | 1 | 1 | $Hd0 = U_{13}' U_{14}' U_{15} U_{16}$ |
| 0 | 1 | 0 | 0 | $Hd1 = U_{13}' U_{14} U_{15}' U_{16}'$ |
| 0 | 1 | 0 | 1 | $Hd2 = U_{13}' U_{14} U_{15}' U_{16}$ |
| 0 | 1 | 1 | 0 | $Hd3 = U_{13}' U_{14} U_{15} U_{16}'$ |
| 0 | 1 | 1 | 1 | $Hd4 = U_{13}' U_{14} U_{15} U_{16}$ |
| 1 | 0 | 0 | 0 | $Hd5 = U_{13} U_{14}' U_{15}' U_{16}'$ |
| 1 | 0 | 0 | 1 | $Hd6 = U_{13} U_{14}' U_{15}' U_{16}$ |
| 1 | 0 | 1 | 0 | $Hd7 = U_{13} U_{14}' U_{15} U_{16}'$ |
| 1 | 0 | 1 | 1 | $Hd8 = U_{13} U_{14}' U_{15} U_{16}$ |
| 1 | 1 | 0 | 0 | $Hd9 = U_{13} U_{14} U_{15}' U_{16}'$ |

INVENTORS:
John F. Donan
Daniel J. Daugherty
Willis E. Dobbins
By Carl Beust
Louis A. Kline
John T. Matlago, agent
Their Attorneys May 3, 1960 J. F. DONAN ET AL 2,935,734

MEMORY SELECTING SYSTEM

Filed Aug. 17, 1954 12 Sheets-Sheet 5

INVENTORS:
John F. Donan
Daniel J. Daugherty
Willis E. Dobbins
By Carl Beust
Louis A. Kline
John T. Matlago, Agent
Their Attorneys INVENTORS:
John F. Donan
Daniel J. Daugherty
Willis E. Dobbins
Carl Beust
By Louis A Kline
John T. Matlago, Agent
Their Attorneys

Fig. 15

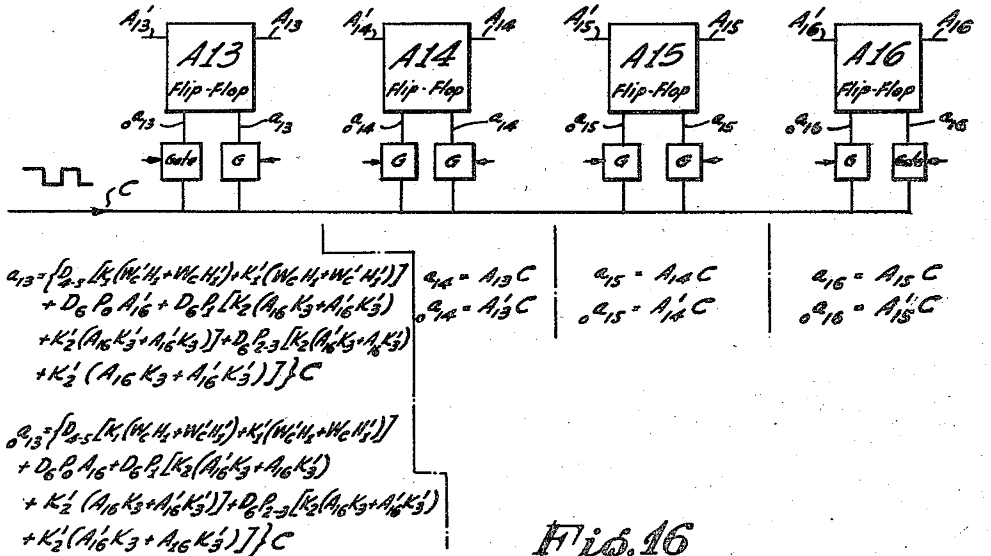

Fig. 16

$D_{4-5}$ Table

| | Adder Inputs | | | Sum | Carry 0→1 | Carry 1→0 |
|---|---|---|---|---|---|---|
| | We* | H1 | K1 | | $k_1$ | $_0k_1$ |
| I | 0 | 0 | 0 | 1 | 0 | 0 |
| II | 0 | 0 | 1 | 0 | 0 | 0 |
| III | 0 | 1 | 0 | 0 | 1 | 0 |
| IV | 0 | 1 | 1 | 1 | 0 | 0 |
| V | 1 | 0 | 0 | 0 | 0 | 0 |
| VI | 1 | 0 | 1 | 1 | 0 | 1 |
| VII | 1 | 1 | 0 | 1 | 0 | 0 |
| VIII | 1 | 1 | 1 | 0 | 0 | 0 |

*Complement of We added $a_{13} = [K_1(W_c'H_1+W_cH_1')+K_1'(W_cH_1+W_c'H_1')]C$
$_0a_{13} = [K_1(W_cH_1+W_c'H_1')+K_1'(W_c'H_1+W_cH_1')]C$
$k_1 = W_c'H_1C$
$_0k_1 = W_cH_1'C$

Fig. 17

$D_6P_1$ Table

| Fixup Adder Inputs | | | Sum | Carry 0→1 | Carry 1→0 |
|---|---|---|---|---|---|
| A16 | K3 | K2 | | $k_2$ | $_0k_2$ |
| 0 | 0 | 0 | 0 | 0 | 0 |
| 0 | 0 | 1 | 1 | 0 | 1 |
| 0 | 1 | 0 | 1 | 0 | 0 |
| 0 | 1 | 1 | 0 | 0 | 0 |
| 1 | 0 | 0 | 1 | 0 | 0 |
| 1 | 0 | 1 | 0 | 0 | 0 |
| 1 | 1 | 0 | 0 | 1 | 0 |
| 1 | 1 | 1 | 1 | 0 | 0 |

$a_{13} = [K_2(A_{16}K_3+A_{16}'K_3')+K_2'(A_{16}K_3'+A_{16}'K_3)]C$
$_0a_{13} = [K_2(A_{16}'K_3+A_{16}K_3')+K_2'(A_{16}K_3+A_{16}'K_3')]C$
$k_2 = A_{16}K_3C$
$_0k_2 = A_{16}'K_3'C$

Fig. 18

$D_6P_{2-3}$ Table

| Fixup Adder Inputs | | | Sum | Carry 0→1 | Carry 1→0 |
|---|---|---|---|---|---|
| A16 | K3* | K2 | | $k_2$ | $_0k_2$ |
| 0 | 0 | 0 | 1 | 0 | 0 |
| 0 | 0 | 1 | 0 | 0 | 0 |
| 0 | 1 | 0 | 0 | 0 | 0 |
| 0 | 1 | 1 | 1 | 0 | 1 |
| 1 | 0 | 0 | 0 | 1 | 0 |
| 1 | 0 | 1 | 1 | 0 | 0 |
| 1 | 1 | 0 | 1 | 0 | 0 |
| 1 | 1 | 1 | 0 | 0 | 0 |

*Complement of $K_3$ added $a_{13} = [K_2(A_{16}'K_3+A_{16}K_3')+K_2'(A_{16}K_3+A_{16}'K_3')]C$
$_0a_{13} = [K_2(A_{16}K_3+A_{16}'K_3')+K_2'(A_{16}'K_3+A_{16}K_3')]C$
$k_2 = A_{16}K_3'C$ (for $D_6P_2$ Only)
$_0k_2 = A_{16}'K_3C$ (for $D_6P_2$ Only)

INVENTORS:
John F. Donan
Daniel J. Dougherty
Willis E. Dobbins
By Carl Beust
Louis A. Kline
John J. Matlago, Agent
Their Attorneys INVENTORS
John F. Donan
Daniel J. Daugherty
Willis E. Dobbins Carl Beust
By Louis A Kline
John T. Matlago, Agent
Their Attorneys May 3, 1960 — J. F. DONAN ET AL — 2,935,734

MEMORY SELECTING SYSTEM

Filed Aug. 17, 1954 — 12 Sheets-Sheet 9

INVENTORS.
John F. Donan
Daniel J. Daugherty
Willis E. Dobbins

By Carl Beust
Louis A. Kline
John T. Matlage, Agent
Their Attorneys

May 3, 1960 J. F. DONAN ET AL 2,935,734

MEMORY SELECTING SYSTEM

Filed Aug. 17, 1954 12 Sheets-Sheet 10

INVENTORS:
John F. Donan
Daniel J. Daugherty
Willis E. Dobbins

By Carl Beust
Louis A. Kline
John T. Matlago, Agent
Their Attorneys

INVENTORS:
John F. Donan
Daniel J. Daugherty
Willis E. Dobbins

By Carl Berust
Louis A. Kline
John T. Matlago, Agent
Their Attorneys

May 3, 1960 J. F. DONAN ET AL 2,935,734

MEMORY SELECTING SYSTEM

Filed Aug. 17, 1954 12 Sheets-Sheet 12

INVENTORS:
John F. Donan
Daniel J. Daugherty
Willis E. Dobbins

Carl Beust

By Louis A. Kline

John J. Matlago, agent

Their Attorneys 2,935,734

MEMORY SELECTING SYSTEM

John F. Donan, Reseda, Daniel J. Daugherty, Torrance, and Willis E. Dobbins, Manhattan Beach, Calif., assignors to The National Cash Register Company, Dayton, Ohio, a corporation of Maryland Application August 17, 1954, Serial No. 450,291

10 Claims. (Cl. 340—174)

This invention relates to the process of searching the memory of a digital computer for a designated storage portion thereof and more particularly to means for reducing the average time required for the arithmetic unit of a digital computer to communicate with a particular storage register on a rotating drum memory.

A general purpose digital computer is designed to manipulate data susceptible to representation by digital techniques. Such data takes the form of a problem which in computer operation is reduced to a rather extensive routine by means of appropriate programming. This routine often requires the repetition of an operation, auxiliary to the actual computation, which, although of relatively short duration, may cumulatively expend operating time far in excess of that taken by the computer to perform the actual computation. Probably the most frequently occurring of such repeated auxiliary operations is that of "look-up" which involves for example, searching the drum memory for a particular address and transferring the information stored therein to an arithmetic register of the computer where it may be appropriately handled in subsequent operations, and then returned to the drum memory by a similar "look-up" operation. This process requires a period of time commonly designated as access time. For a particular cyclic system, of which a magnetic drum computer is representative, access time is primarily a function of the time lapse between successive appearances of the same storage address on the drum at a location where information can be either recorded into or sensed from this address. Since access time comprises an appreciable portion of computer operating time, and is consequently a factor in the cost of operating the computer, it is apparent that it is highly desirable that it be minimized.

Briefly, the preferred embodiment of the present invention accomplishes a reduction in access time required by a computer to communicate with its memory by the employment of a plurality of equally spaced heads about each of the channels of the computer magnetic drum memory, together with logical circuitry which selects the head next to be operatively in a position to sense information from or record information into the desired storage register. Assuming a particular channel is already selected, the process of head selection involves a subtraction of the coded decimal numbers representing the arc addresses of the storage register, as read by the head associated with the arc address channel on the drum, from the arc address of the desired storage register, as stored in a recirculating register cooperating with the arithmetic unit. Immediately upon effecting this subtraction process, a numeral designating the proper head to be used is determined; and, assuming information is to be read from the memory, the output of this head is gated so as to be made available at the arithmetic unit to the exclusion of the others. Since there are several storage registers provided between successive heads of the channel, simultaneous with this head selection, further circuitry is provided for comparing the arc address as read from the arc address channel with the arc address of the storage register desired. It is not until this comparison is effected that the arithmetic unit is enabled to sense the signals passing the gate previously selected which correspond to the desired storage register.

It is thus an object of this invention to provide an improved computer memory system wherein the time required for communicating with a particular storage register on the memory is minimized.

Another object of this invention is to provide electrical components and circuitry to accomplish a gated and timed selection of one of a plurality of magnetic heads situated around the periphery of a drum memory.

A further object of this invention is to provide a novel computer magnetic drum storage system operable in accordance with bistable state elements responsive to logical networks capable of being defined in the notation of Boolean algebra.

Other objects and many of the attendant advantages of this invention will be readily appreciated as the same becomes better understood by reference to the preferred embodiment detailed in the following description and the accompanying drawings wherein.

Figures 2, 3, 4, 5:
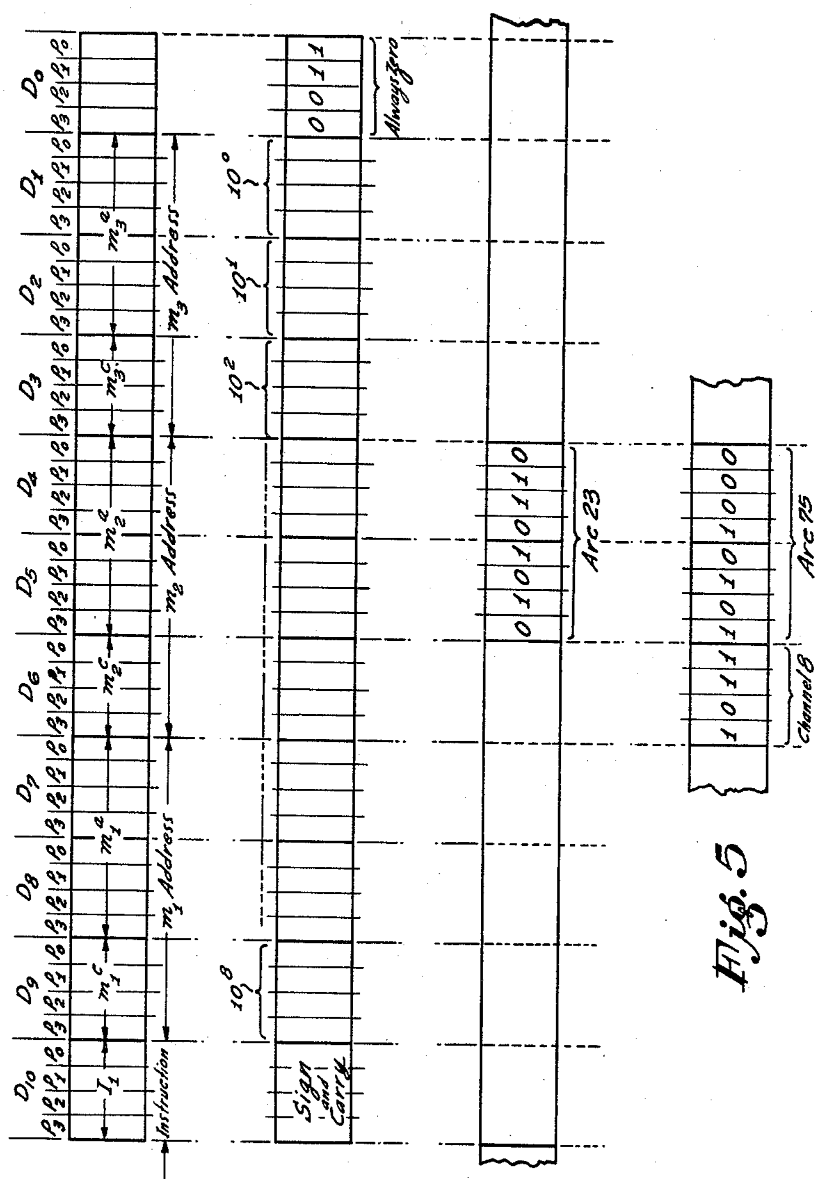
Fig. 2 shows the code pattern employed during a word period to represent a command.
Fig. 3 shows the code pattern employed during a word period to represent a number.
Fig. 4 illustrates one word period of the arc address channel showing how the code pattern of a particular arc address is recorded thereon.

Fig. 5 presents the arrangement of the address specifying the storage register desired as stored in the H recirculating register.

Figure 6:
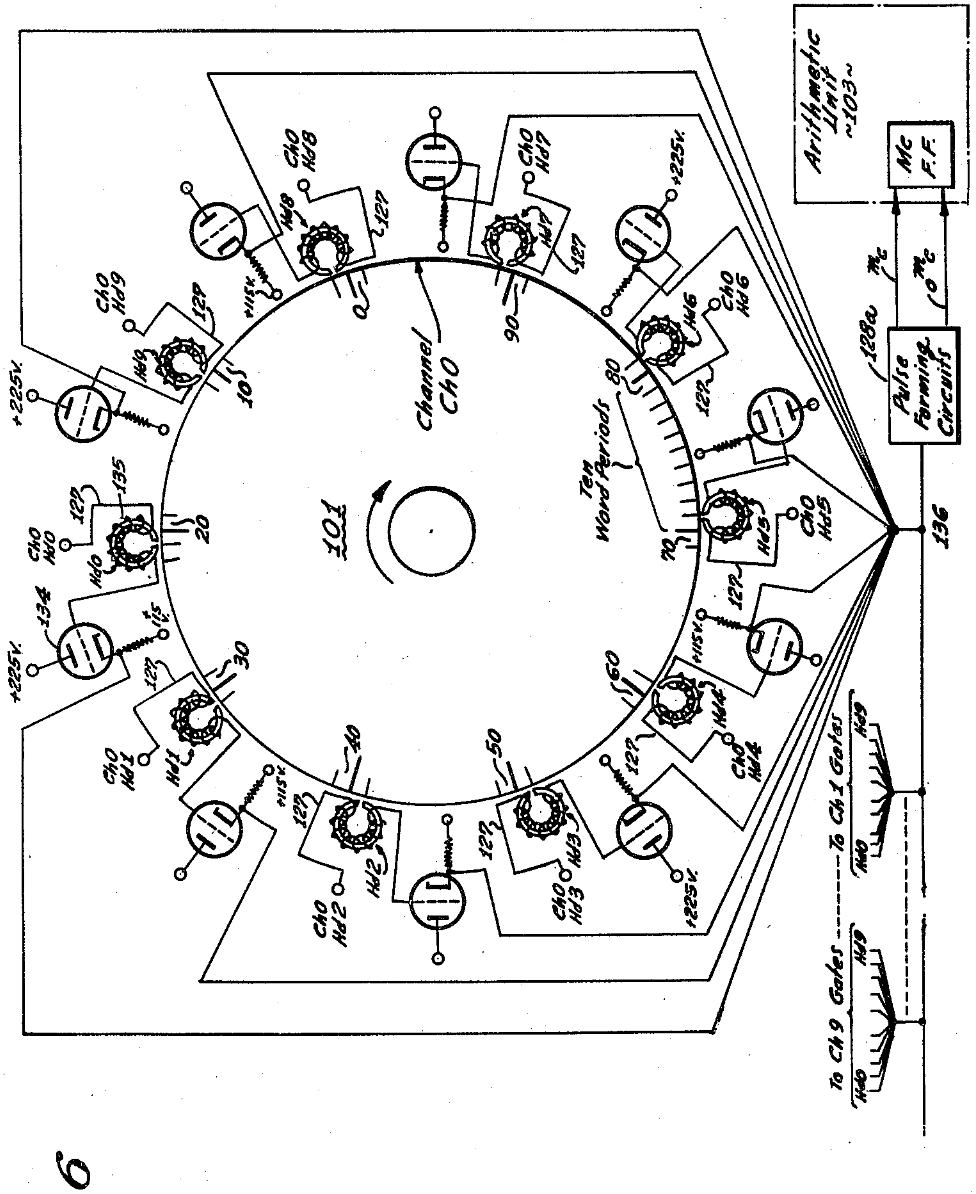

Fig. 6 shows in particular a diagram of the memory channel gating circuits provided for one of the memory channels on the drum and the relation thereof to the arithmetic unit.

Fig. 7 is a circuit diagram of the channel selector matrix for the memory channels.

Fig. 8 is a table showing the states of the channel selector flip-flops, U9 to U12.

Fig. 9 is a circuit diagram of the head selector matrix for the memory channels.

Fig. 10 is a table showing the states of the head selector flip-flops, U13 to U16.

Figure 11:
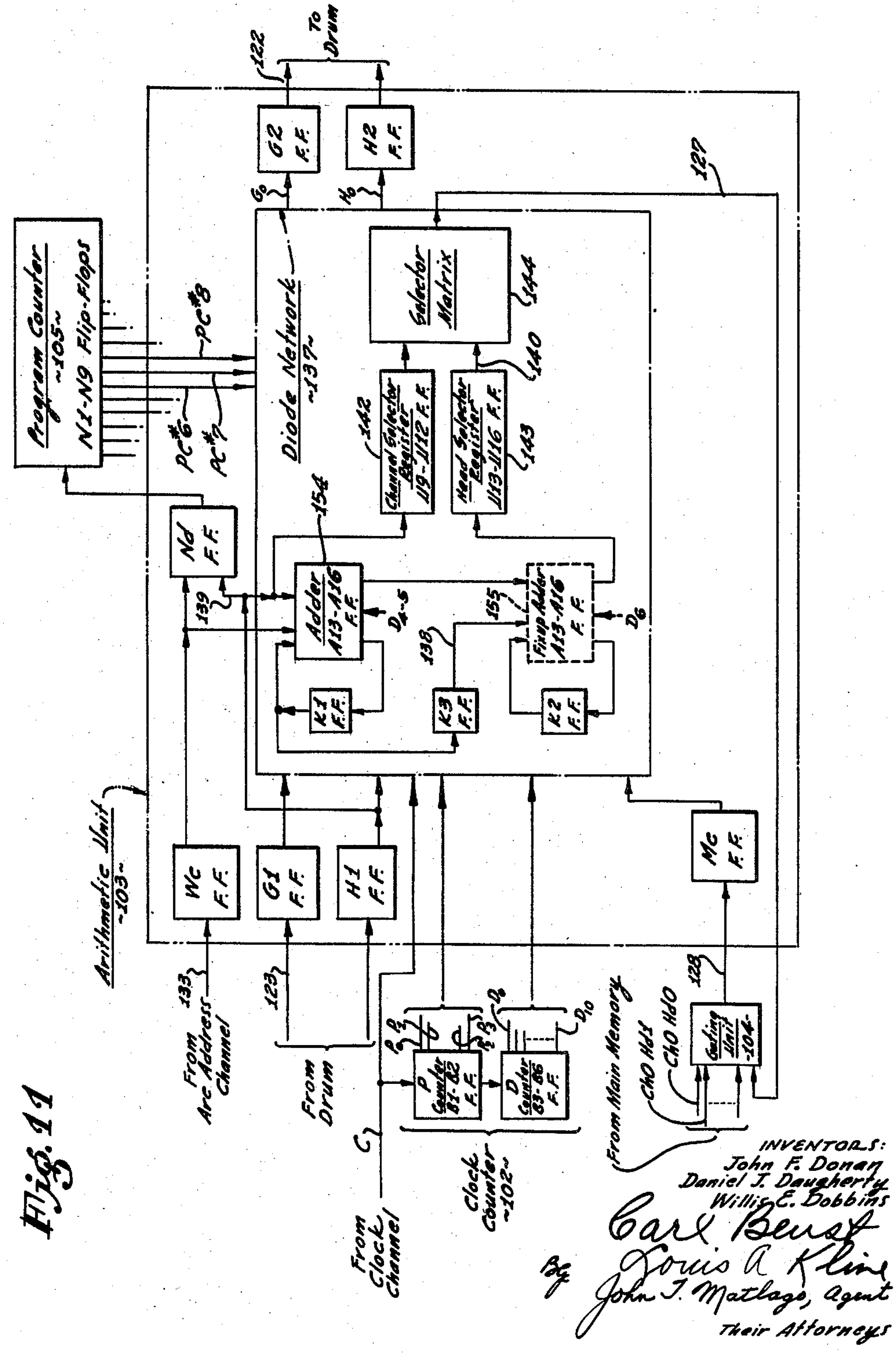

Fig. 11 is an overall block diagram of the portion of the computer arithmetic unit relevant to the "look-up" process.

Figure 12:
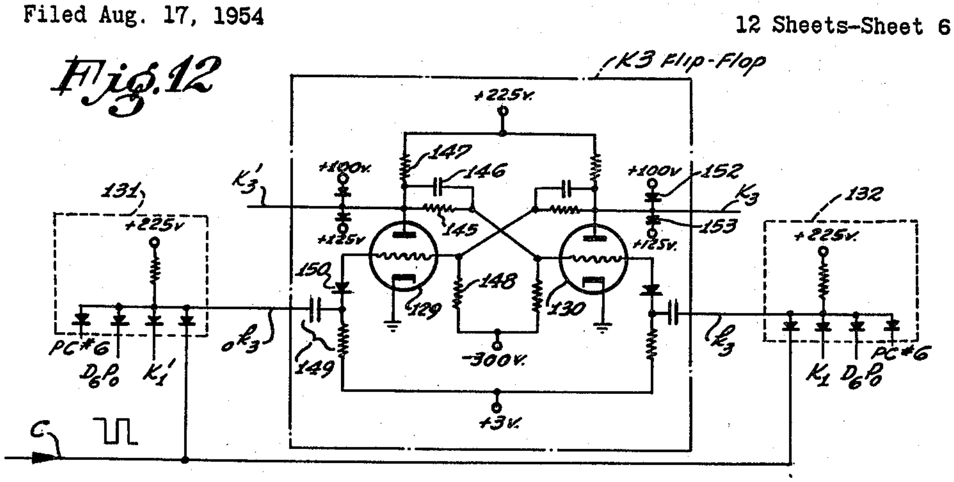

Fig. 12 is a schematic circuit diagram of the fixup adder decision flip-flop K3.

Figure 13:
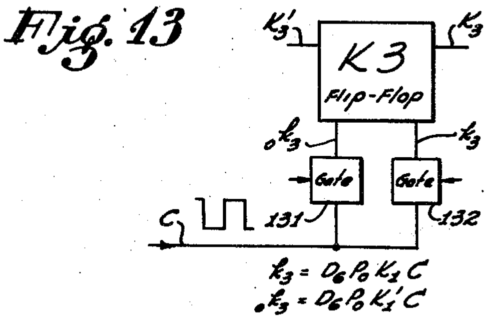

Fig. 13 is a block diagram of flip-flop K3 of Fig. 12 together with the logical equations defining its operation.

Figure 14:
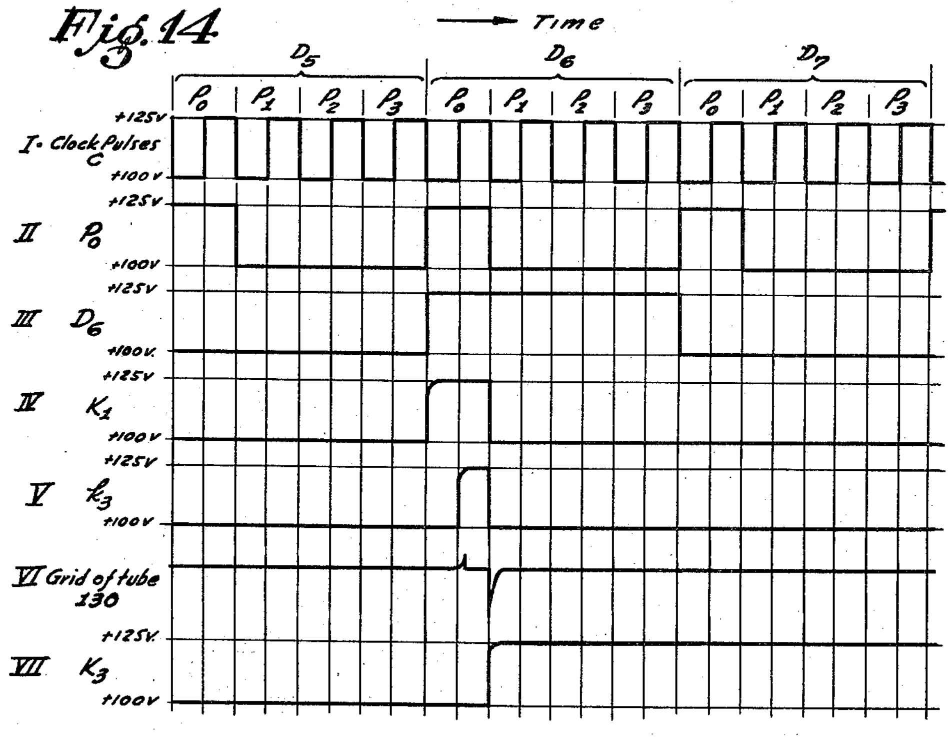

Fig. 14 is a graph of the waveforms explaining the operation of flip-flop K3.

Fig. 15 is a block diagram of adder flip-flops A13 to A16, together with the logical equations defining their operation.

Figs. 16, 17, and 18 are tables illustrating the derivation of the logical equations defining the operation of the adder input flip-flop A13, and the carry flip-flops K1 and K2.

Figure 19:
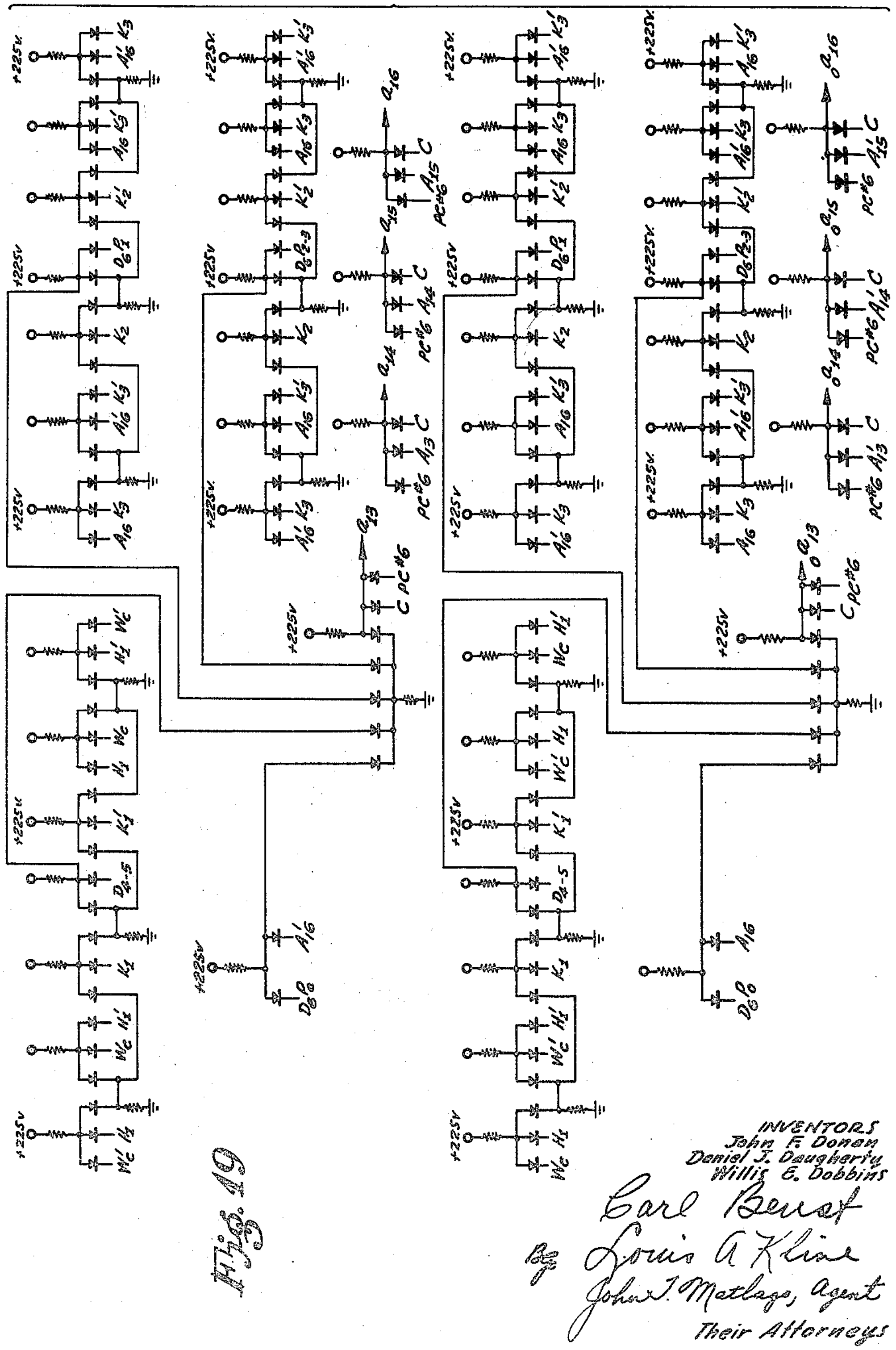

Fig. 19 is an electrical diagram of the trigger input equation networks for the A13 to A16 flip-flops.

Figure 20:
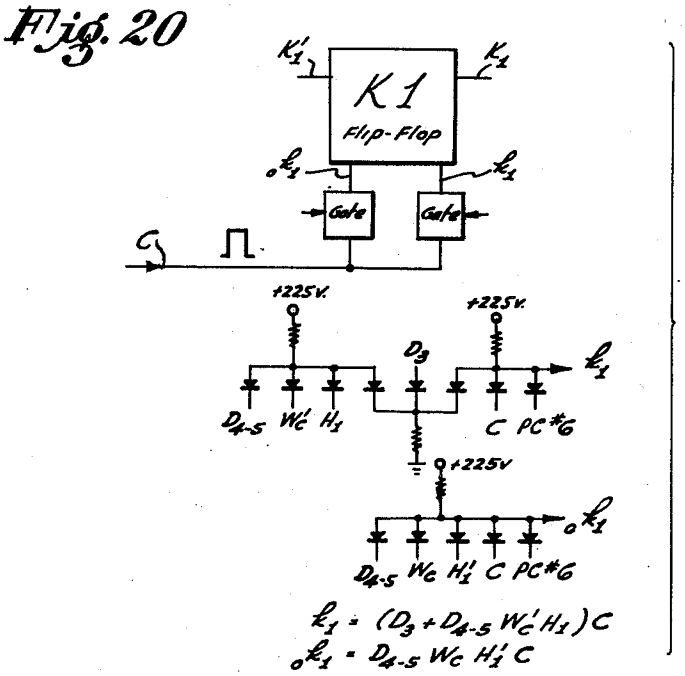

Fig. 20 is a block diagram of adder carry flip-flop K1 together with the electrical diagram of the diode networks for generating its trigger input equations.

Figure 21:
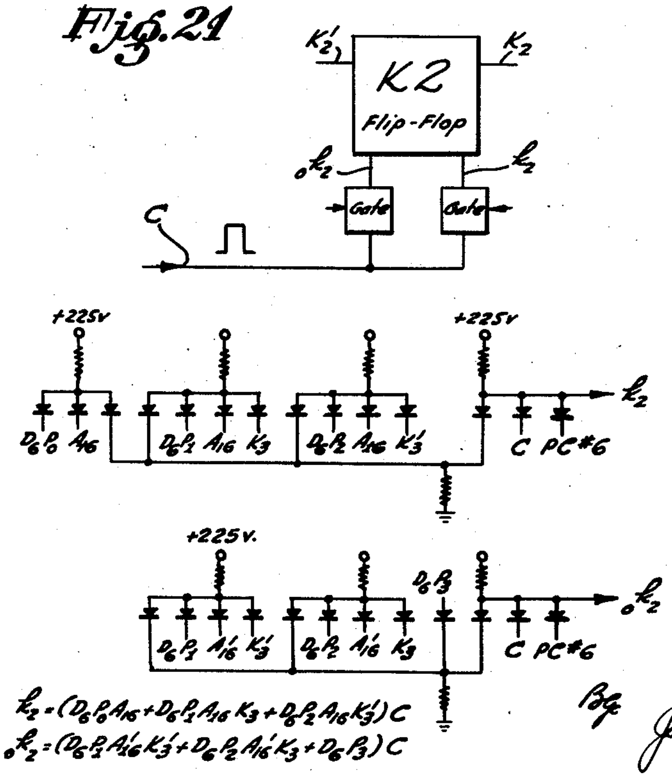

Fig. 21 is a block diagram of fixup adder carry flip-flop K2 together with the electrical diagram of the diode networks for generating its trigger input equations.

Figure 22:
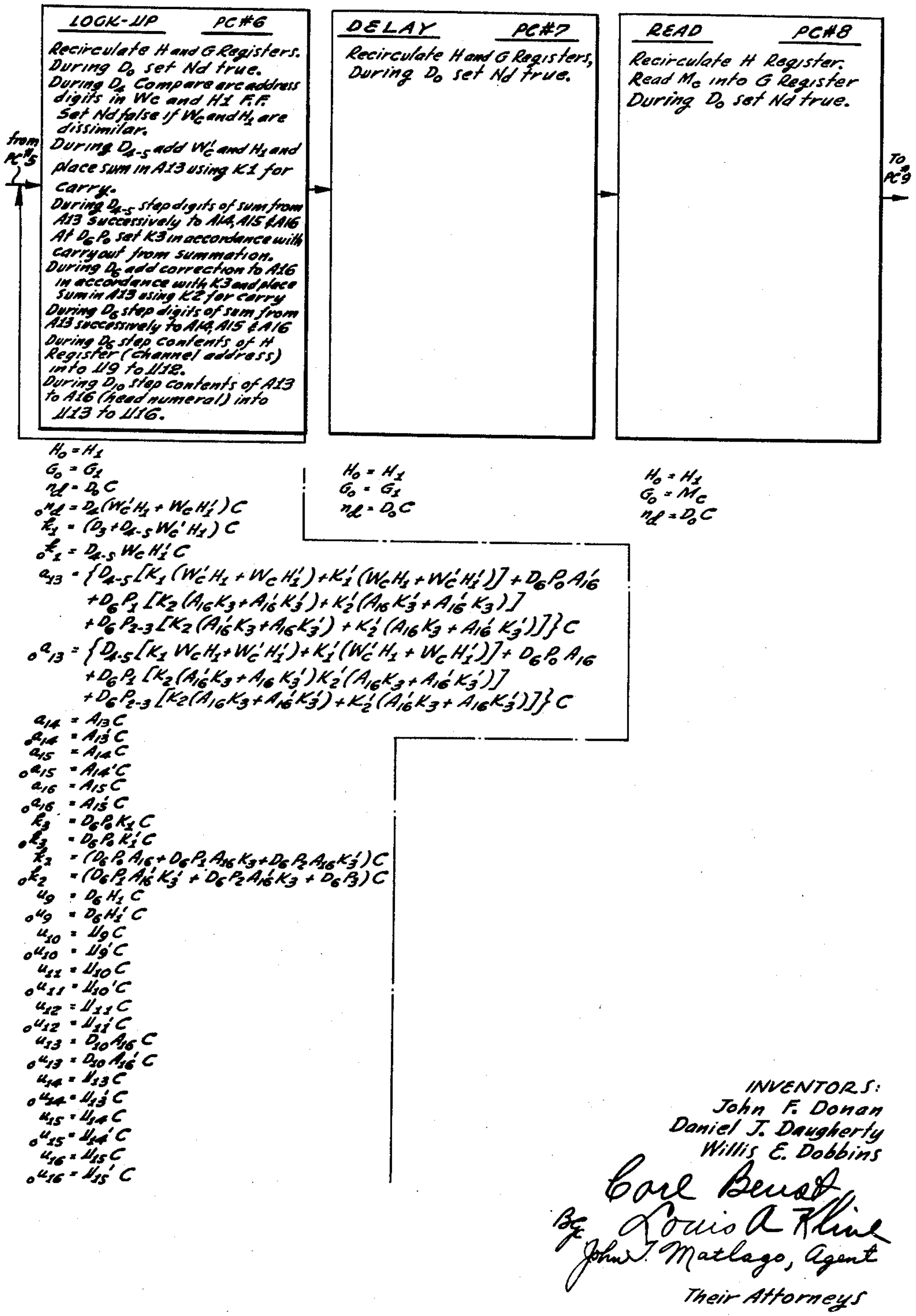

Fig. 22 is a portion of the functional flow diagram of the computer relevant to the "look-up" process.

Figure 23:
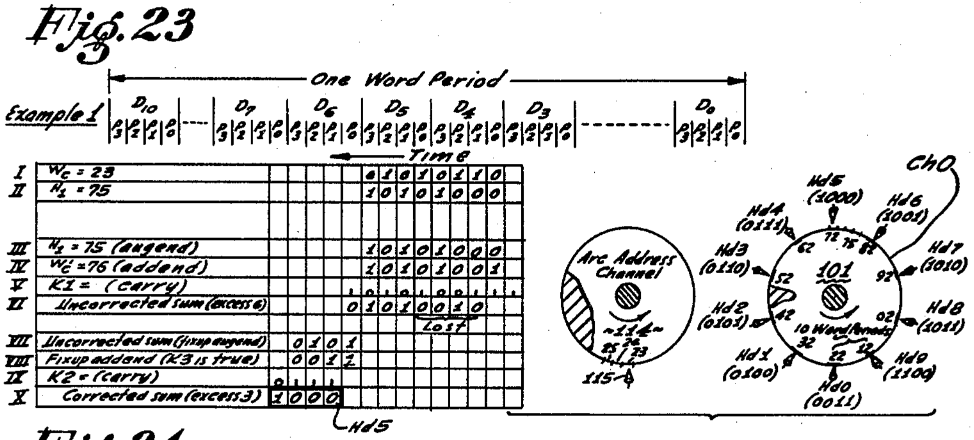

Fig. 23 shows an example of how head identification is performed by the computer for the condition characterized by the excess 6 sum having a carry-out.

Figure 24:
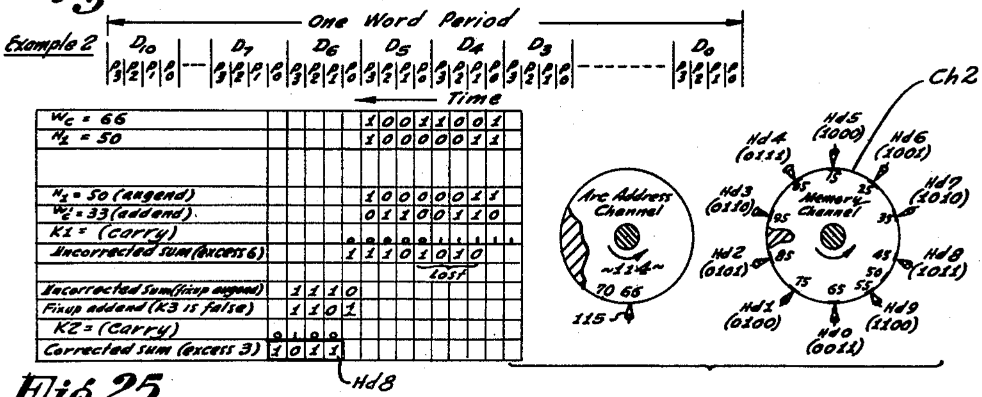

Fig. 24 shows an example of how head identification is performed by the computer for the condition characterized by the excess 6 sum not having a carry-out.

Figure 25:
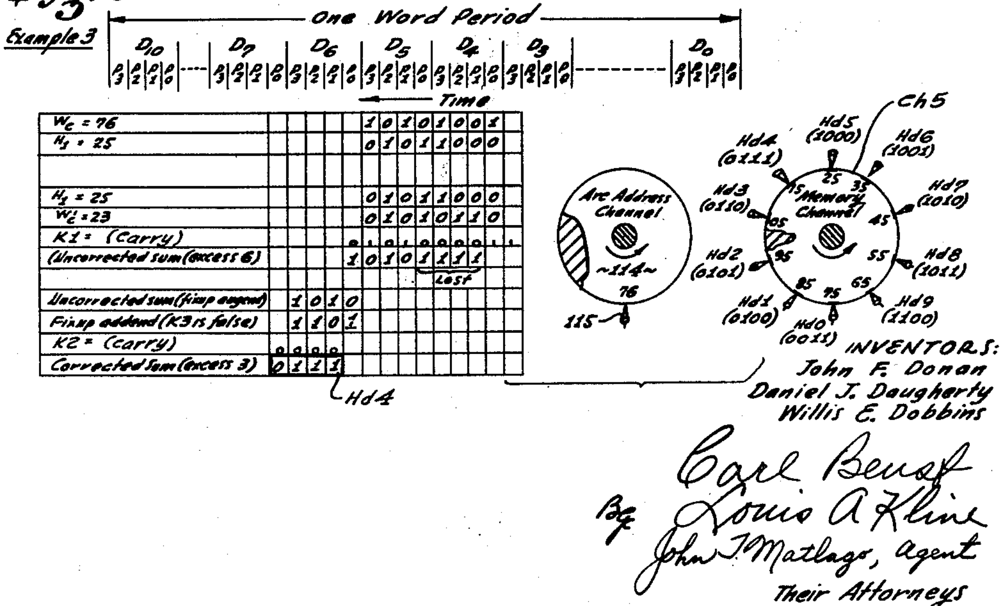

Fig. 25 shows an example of how head identification is performed by the computer for the condition where the desired arc is passing a memory channel head at the instant the "look-up" process is initiated.

Figure 26:
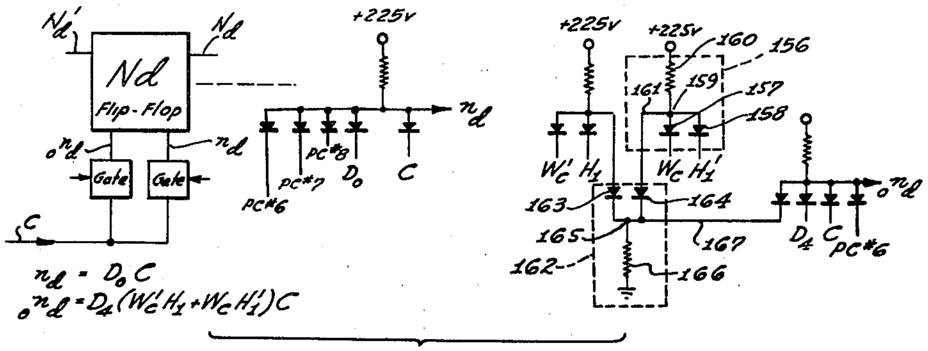

Fig. 26 is a block diagram of flip-flop Nd together with the electrical diagram of the diode networks for generating its trigger input equations.

Figure 27:
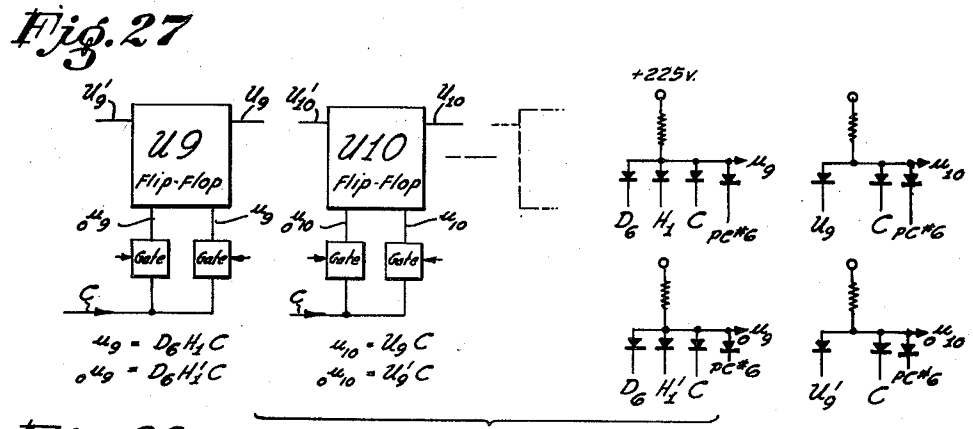

Fig. 27 is a block diagram of flip-flops U9, U10, etc. comprising the channel selector register together with an electrical diagram of the diode networks for generating their trigger input equations.

Figure 28:
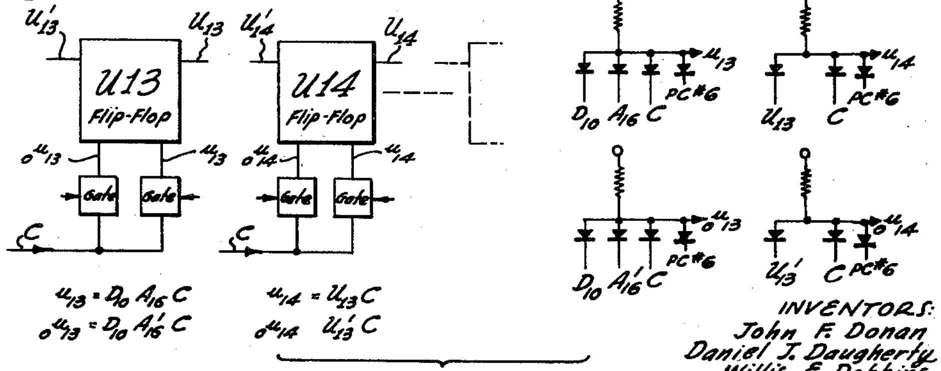

Fig. 28 is a block diagram of flip-flops U13, U14, etc. comprising the head selector register together with an electrical diagram of the diode networks for generating their trigger input equations.

The embodiment herein disclosed is intended as part of a general purpose computer. It is to be noted that this specification and the accompanying drawings will describe and illustrate in detail only such portions of the computer as are directly concerned with the present invention and are necessary to explain the principle thereof.

Figure 1:
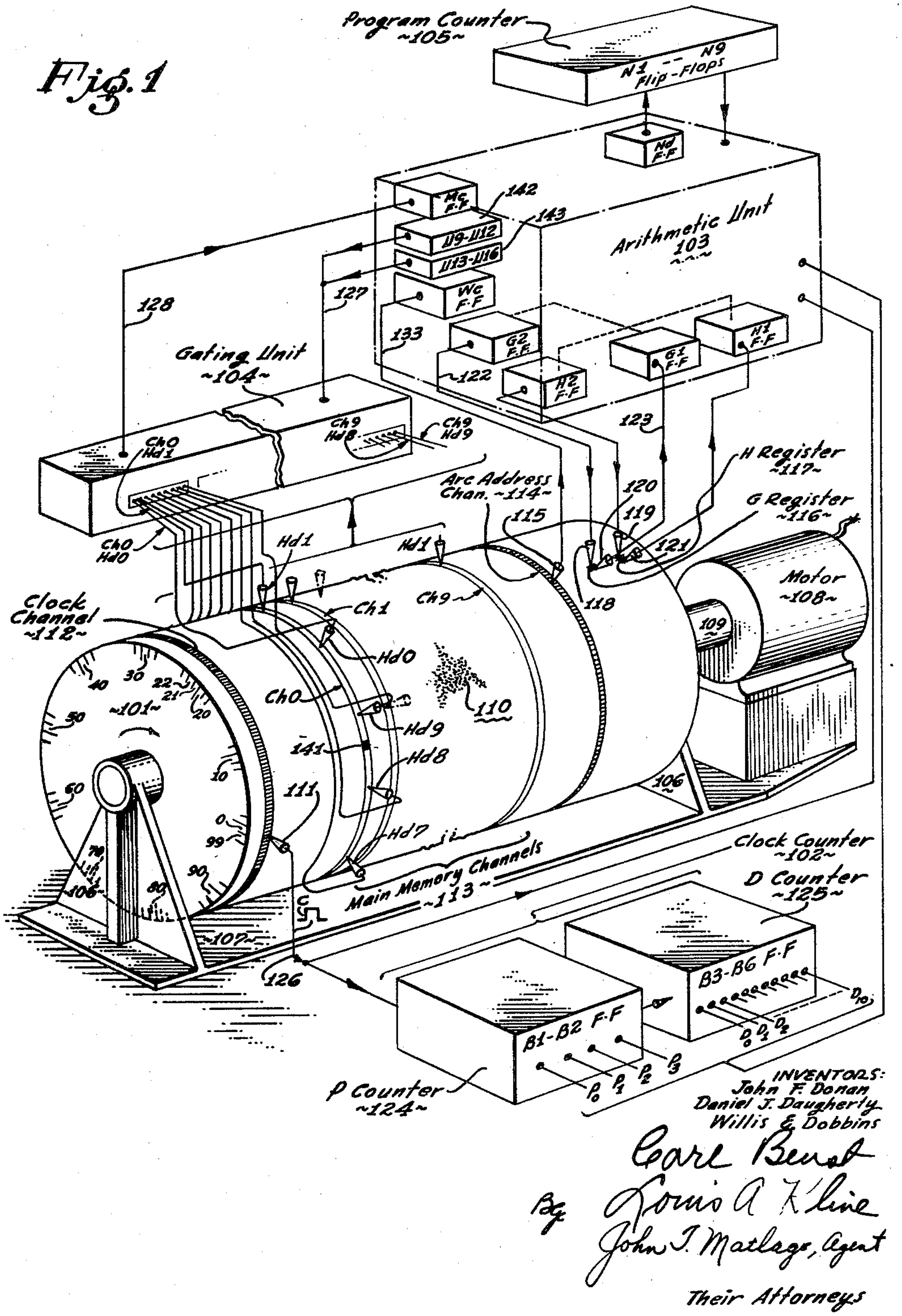
Fig. 1 is a perspective view illustrating the cooperative relationship of relevant portions of the computer system exemplifying the present invention.

Referring first to Fig. 1, an overall pictorial view of the portions of the general purpose computer relevant to the invention is presented. Here is shown a memory drum 101 provided on the surface thereof with a plurality of storage registers comprising arcs or portions of circumferential channels, such as storage register 141. Also is shown an arithmetic unit 103 which operates integrally with the drum 101 by way of G and H recirculating registers 116 and 117, respectively. In addition, here is shown clock counter 102, gating unit 104, program counter 105, and interconnecting lines intended to be representative of functional cooperation between these components. It is to be noted that the components in Fig. 1 are not to be considered physically unique but are to be considered separate only from a functional viewpoint and have been arranged as shown for the purpose of explaining the invention. It is in this regard that they will be described. For example, arithmetic unit 103 and gating unit 104 may employ circuitry in common and thus a description of this circuitry will consider only its function when so used and not define it as a physical part of either unit.

Memory drum 101 is supported on suitable arbor mounts 106 and a base plate 107 and is rotated in a clockwise direction, as indicated by the arrow on its left end, by motor 108 through drive shaft 109. Deposited on the surface of drum 101 is a coating 110 of magnetic material, such as ferric oxide, which enables information to be stored as magnetic patterns thereon. Shown stationarily positioned to have a working relation with coating 110 are a plurality of sensing elements, such as head 111 which is responsive to magnetic signals recorded on a clock channel 112. Thus it can be seen that as drum 101 rotates, circumferential channels, spaced along the drum longitudinal axis, are effectively described thereon by the stationary heads. There are, in addition to clock channel 112, ten main memory channels 113 and an arc address channel 114. It will be noted that clock channel 112 and arc address channel 114 each have but one head associated therewith, whereas the ten memory channels 113 are each provided with ten equally spaced heads.

Commencing from the left end of the drum 101, the first channel shown is clock channel 112, which has associated therewith clock head 111. Clock channel 112 completely circumscribes drum 101 and contains a permanently recorded magnetic flux pattern representing an electrical sine wave so as to form a closed loop. Each cycle of this sine wave defines an elemental memory area on the drum periphery on which a binary bit of information may be recorded. Thus the signals on clock channel 112 divide the drum circumference into a fixed number of such elemental areas; namely, 4400 in the present computer. Clock head 111 is stationarily positioned close to the drum periphery and senses the changes in magnetic flux pattern, thereby generating an electrical signal indicative of each sine wave cycle. In construction, clock head 111 is comprised of a split core of soft iron or a like conductor of magnetic lines of force, and a coil wound thereon, in which the electrical sine waveform is induced as the magnetic flux on drum 101 moves past the core gap. One terminal of the coil is grounded and the other terminal is connected to circuitry designed to shape the induced voltage preliminary to causing it to serve as a driving voltage for other components.

It has already been noted that interconnecting lines between computer components of Fig. 1 are intended to be a functional representation of cooperation therebetween and may actually comprise not only connections but also circuitry and equipment. A consideration of clock line 126 will exemplify. Although clock channel 112 is impressed with a pattern resembling a sine wave, the clock input to clock counter 102 and arithmetic unit 103 is a symmetrical square wave, the period of which is equal to that of the original sine wave and the amplitude of which is clamped between +100 v. D.C. and +125 v. D.C. This square wave will be referred to hereinafter as clock proposition C (see Fig. 14 line I), and the time period between trailing edges of clock proposition C will be designated one clock period. Additionally, the half of clock proposition C which is at the potential of +125 v. D.C. will be referred to as the clock pulse, since it is the trailing edge of this half only which triggers logical circuitry in the computer.

Circuitry which effectuates the change from sine wave to clock proposition C is driven by the output of clock head 111. As previously stated, this circuitry is schematically represented in Fig. 1 by clock line 126 and may comprise several stages of amplification, a pulse shaping circuit, a triggering circuit of the Schmidt type, and a diode clamping arrangement, as already disclosed in the prior art. The clock proposition C thus provided is used for synchronizing logical networks of arithmetic unit 103 and to drive clock counter 102. It should be understood that all logical propositions in the computer operate at the same two voltage levels as clock proposition C, i.e., +100 v. D.C. and +125 v. D.C.

It is by utilizing the signals induced by clock channel 112 as a reference during reading and recording that the computer effectively divides the other circumferential channels of drum 101 into a similar number of elemental memory areas and also synchronizes the operation of all circuits so that they operate in accordance with a basic timing logic. Each of these elemental memory areas on the periphery of drum 101 in the other channels shown in Fig. 1 is capable of containing a digit of binary information, i.e., a saturated flux pattern either in one direction or the other. When the flux is in one direction in a given elemental memory area, a binary digit "one" is represented; when it is in the other direction, a binary digit "zero" is represented. Since the non-return-to-zero method of storing information on the drum is employed, the recorded flux pattern changes for successive memory areas only when the binary digits of a sequence change from 0 to 1, or vice versa.

Computer components are designed to serially handle information in blocks consisting of a fixed number of binary digits. These blocks may represent either commands or numbers and are commonly referred to as "words." A word is comprised of a sequence of 44 consecutive binary digits and thus requires 44 consecutive memory areas for storage. The portion or arc of a circumferential channel in which a word may be recorded, such as arc 141 of Fig. 1, is designated a storage register. Since clock channel 112 contains 4400 clock signals, 100 such storage registers are provided along the circumference, that is, on each channel, of drum 101. As shown on the left end of drum 101 in Fig. 1, each of the arcs occupied by a storage register, such as arc 141, is assigned an arcuate address, 0 through 99, running consecutively in a counterclockwise direction such that the heads sense information in successive arcs of higher number except for the discontinuity when arc 99 is succeeded by arc 0. The time required for one arc to pass a head is designated as one word period which is defined by 44 cycles of the sine wave passing clock channel head 111.

In order to enable arithmetic unit 103 to properly respond to and identify each of the digits in a storage register being sensed at any given time, clock counter 102, comprised of P counter 124 and D counter 125, is provided for counting successive clock periods. Clock counter 102 responds to 44 clock periods to define each word period. P counter 124 responds directly to the output of clock line 126 (i.e., to clock pulses) and has a capacity of four counts, namely, $P_0$, $P_1$, $P_2$, and $P_3$, before it resets. A carry pulse generated once each cycle of P counter 124 (i.e., at the end of the $P_3$ pulse) causes D counter 125 to manifest a new count throughout the next cycle of P counter 124. The capacity of D counter 125 is 16 counts of which the computer employs 11, i.e., although D counter 125 can count to 16, it is forced to reset to zero after the eleventh count. The counts of D counter 125 are designated $D_0$, $D_1$ . . . $D_{10}$ and with counts of P counter 124 are manifested by signal outputs feeding into arithmetic unit 103 such that, as drum 101 rotates and an arc or storage register is being sensed by the heads, succeeding elemental memory areas of the arc, hereinafter to be designated "pulse positions," are identified by clock counter 102 as $D_0P_0$, $D_0P_1$, $D_0P_2$, $D_0P_3$, $D_1P_0$ . . . $D_{10}P_3$. In summary, each word period is divided by this arrangement into eleven D (digit) periods each of which is subdivided into four P (pulse) positions and in each of the latter may be stored one binary digit of a binary-coded decimal digit. Accordingly, by noting the counts in clock counter 102, the pulse position in an arc, or storage register, presently being scanned by the heads on drum 101 can be observed.

The means employed in clock counter 102 to define any pulse position or combination of pulse positions of a word, so that circuitry in arithmetic unit 103 may be arranged to provide proper triggering for flip-flops as required by their respective equations, is well understood in the prior art. Thus, considering P counter 124, Fig. 1 indicates that two flip-flops, B1 and B2, are employed. The arrangement is a parallel one in that clock proposition C is simultaneously applied to all gates associated with the inputs to these flip-flops. The interconnection of the outputs, however, allow the flip-flops to be triggered by successive clock pulses only to change their states to indicate the P cyclical counts. It is well known that there are four possible different arrangements of two flip-flops and here each of the counts $P_0$, $P_1$, $P_2$, and $P_3$ represent a different configuration of flip-flops B1 and B2. The arrangement for D counter 125 is similar, and each of the counts $D_0$, $D_1$ . . . $D_{10}$ represents a different configuration of flip-flops B3 through B6. Depending upon the pulse position of an arc to be represented, a particular configuration of each of the two groups B1—B2 and B3—B6 is routed to arithmetic unit 103 during each clock period generated by clock line 126, effectuating a different arrangement in a matrix type of diode network, the effective output of which is used as an input to logical gates or mixers.

The configuration of computer words and the representation of decimal numerals employed by the computer will next be discussed as preliminary to a description of the other channels of drum 101. The computer employs the "excess 3" binary number system. It is well understood that the excess 3 binary number system requires the use of four binary digits to represent a decimal digit. Thus, by referring, for instance, to Figs. 2 and 3, which show the computer word representations of a command and a number, respectively, it can be seen that an entire D period is required to store a decimal digit. Considering Fig. 2 first, it is seen that the command represented in general notation therein is divided into eleven D periods, marked $D_0$ through $D_{10}$ from right to left, while each D period is further divided into four P positions. The information in a command is defined by the general notation "$I_1$, $m_1$, $m_2$, $m_3$," where $m_1$, $m_2$, and $m_3$ represent addresses (arc and channel) of arcs or storage registers in the ten memory channels 113, and $I_1$ corresponds to an instruction to be carried out by arithmetic unit 103. Each of the sections $m_1$, $m_2$, and $m_3$ of the command is in turn divided into two portions, such as $m_2^a$ and $m_2^c$ for the $m_2$ address. The superscripts "*a*" and "*c*" characterize that information in these portions are descriptive of the arc address and channel address, respectively, of an arc on drum 101. Hence $m_2^a$, located in periods $D_4$ and $D_5$, comprises binary-coded excess 3 numerals representative of any of the arcs 0 through 99; and $m_2^c$, located in period $D_6$, comprises a binary-coded excess 3 numeral representative of any of the ten main memory channels 113, hereinafter defined as Ch0 through Ch9, inclusive. It will be noted that when the computer places a binary-coded excess 3 numeral in a D period, the least significant binary digit of the numeral occupies the $P_0$ position and binary digits of successively greater significance occupy the positions $P_1$, $P_2$, and $P_3$, respectively. Also, the least significant decimal digit of a decimal numeral is placed in the lowest order D period of those assigned to the decimal numeral.

With regard to Fig. 3, here it is shown that the arrangement for a number is divided into D periods and P positions similar to the arrangement of Fig. 2. The computer provides for operating on decimal numerals 9 digits in length, to which binary numerals 36 digits in length contained in periods $D_1$ through $D_9$ are equivalent. The $D_{10}$ period of the number contains coded information indicating whether the sign of the numeral is positive or negative and whether or not a carry digit beyond the most significant digit of the numeral has been obtained as a result of the preceding computation. It will be noted that, in accordance with the rotation of drum 101, the first position of a word to pass a particular head is the $D_0P_0$ position.

Returning again to Fig. 1 and continuing with a description of the other channels on drum 101, next in order from the left end thereof are the ten main memory channels Ch0 to Ch9, inclusive. The information in main memory 113 is comprised of words constructed as aforementioned, on which and by which the computer operates. Each main memory channel is equipped with ten stationary memory heads, designated Hd0 to Hd9, inclusive, spaced at equal intervals along the channel. These heads are used for both reading and recording. Thus there are ten arcs or storage registers between successive memory heads of a memory channel and ten word periods are required for a particular storage register to traverse the distance from one memory head to the next. All memory heads bearing the same identifying numeral are precisely aligned (time-wise) along the drum longitudinal axis and thus sense information in similar memory areas of the arc of the same numeral but in different channels. Stated another way, Hd0 of Ch0 is sensing the contents of the first elemental memory area of arc 22 in Ch0 at the same instant that Hd0 of Ch9 is sensing the contents of the first elemental memory area of arc 22 in Ch9. Since, in this computer, there are 10 memory channels and 100 arcs or storage registers available on each, a total of 1000 arcs or storage registers are provided for storing words. Thus the capacity of drum 101 for storage is 1000 words; and a coder, in setting up a problem, may use any portion thereof. As shown in Fig. 1, information sensed by all memory heads is supplied to gating unit 104.

The next channel on drum 101 is arc address channel 114. Each of the arcs of this channel contains a permanently recorded magnetic pattern representing the binary-coded excess 3 numeral equivalent of a decimal unit more than the decimal numeral which has been assigned to the arc, as indicated at the left end of drum 101 in Fig. 1. Associated with arc address channel 114 is head 115, which senses the code of each arc address as drum 101 revolves. It should be noted that here arc address head 115 is shown precisely aligned with the memory heads Hd0, although this alignment is not required provided that the information encoded in the arcs of arc address channel 114 indicates a decimal unit more than the numeral corresponding to the arc actually passing the memory heads Hd0. In other words, when arc 22 is being sensed by the memory heads Hd0, it is essential that the output of arc address head 115 represent the binary-coded excess 3 equivalent of the decimal numeral 23. Referring to Fig. 4, a diagram of a portion of the arc address channel 114, defining in particular arc 23, is shown. In each of the arcs of arc address channel 114 corresponding to the $m_2{}^a$ portion of a word (i.e., in the $D_{4-5}$ period), signals representing the binary-coded excess 3 numeral indication of the decimal numeral assigned to this arc are permanently recorded. In the computer look-up operation, the present invention provides means to cause arithmetic unit 103 to subtract the arc address, as read from the arc address channel, from the desired arc address as stored in the $D_{4-5}$ portion of the H recirculating register, to obtain a numeral representative of the memory head next to be passed by the desired memory channel storage register as drum 101 revolves. Simultaneously, arithmetic unit 103 compares corresponding digits as read from the arc address and the H recirculating register during $D_4$ time to determine the word period during which this selected memory head will be passed by the desired arc. As shown in Fig. 1, the binary digits read from the arc address channel are serially set up in flip-flop W*c*. It should be noted that the details of the circuitry for serially triggering flip-flop W*c*, in accordance with the magnetic pattern on the arc address channel, have already been disclosed to the art. Briefly, the binary square wave pattern impressed in arc address channel 114 is sensed by arc address head 115 and, due to differentiation thereby, presents pulses representing the leading and trailing edges of the square wave. These pulses are amplified, clipped, clamped between the limits +100 v. D.C. and +125 v. D.C., and applied to the grid input circuits of flip-flop W*c*, through a diode gate such that the leading-edge pulse triggers the flip-flop into one state and the trailing-edge pulse triggers the flip-flop into the opposite state. The grid input circuit diode gates of flip-flop W*c* are synchronized with the clock periods by application of the clock proposition C from clock line 126. These concepts will be further clarified later in connection with the convention adopted to present the computer logic. The output of flip-flop W*c* provides one of the inputs to diode network 137 of arithmetic unit 103, as will also be shown hereinafter.

Still referring to Fig. 1, at the right end of drum 101 are shown the G and H recirculating registers 116 and 117. Each of these recirculating registers has two heads associated with the drum memory, one for reading and the other for recording, arranged such that as drum 101 rotates, a portion of the drum surface will pass the record head first and the read head later. Thus the H recirculating register includes a read head 121 spaced along the drum surface ahead of a record head 119, and the G recirculating register includes a read head 120 spaced along the drum surface ahead of the record head 118. Thus, as far as the recirculating registers are concerned, only a small arcuate portion of the drum surface is used for storing information at a given time. The portion used occupies an area equivalent to less than 44 elemental memory areas, and the information is delayed in arithmetic unit 103 a given number of pulse periods so that the normal recirculating time for each register is 44 clock periods, i.e., one word period. Both of the G and H recirculating registers have their heads interconnected by way of the arithmetic unit 103 so that, for example, when the computer circuitry is set for recirculation in the G register, a particular unit signal on being recorded on the drum surface by record head 118, will be carried by the revolving drum 101 to read head 120, sensed thereby, transmitted to arithmetic unit 103 wherein the signal steps through flip-flop circuits, and is then retransmitted to record head 118 by which it is again recorded. As previously stated, the design of the computer is such that the normal total time required for a particular digit to make one such cycle in the G register or in the H register during normal recirculation is equal to one word period. This is true even if it is desired that this digit undergo a modification. Fig. 5 illustrates the content of the H recirculating register, defining in particular channel Ch8 in the $D_6$ period thereof and arc 75 in the $D_{4-5}$ period thereof.

It should be understood that the read and record circuitry for the G and H recirculating registers is well understood in the prior art. Briefly, as shown in Fig. 11, the output of diode network 137 of arithmetic unit 103 for the G register, designated as proposition $G_0$ ($H_0$ in the case of the H register), is a square wave clamped between +100 v. D.C. and +125 v. D.C., and is fed to the gating circuit of one grid of flip-flop G2 of Fig. 1 and, after inversion, is fed as proposition $G_0'$ to the gating circuit of the other grid of flip-flop G2. Both grid gates are synchronized with clock pulses by clock proposition C as heretofore mentioned. The outputs of flip-flop G2, namely, $G_2$ and $G_2'$, are represented by line 122 and are employed to energize record head 118.

In the computer the processes performed are all divided into sequential steps or time periods of one word duration known as word periods. This is also the time required for information to normally circulate in the G recirculating register or in the H recirculating register. It is the function of program counter 105 to render certain computer circuitry operable at the proper time so as to accomplish each such step operation. Accordingly, program counter 105 generates a plurality of output signals PC#0, PC#1, etc., each of which selects certain networks to respond to the desired inputs during each of the 44 clock periods of a word to generate the desired output propositions. Precisely at the end of each word period, the content of program counter 105 may or may not be affected, depending on the state of a decision component, namely, flip-flop N*d*, during the last, or $D_{10}P_3$ period of a word. If flip-flop N*d* is true during $D_{10}P_3$, program counter 105 is caused to count to the next higher count, whereas if flip-flop N*d* is false during $D_{10}P_3$, program counter 105 is caused to remain in the same count for another word period thus repeating the word program just completed. It follows that if program counter 105 counts, other circuitry of diode network 137 becomes operable commencing at $D_0P_0$ of the next word period, but if program counter 105 remains unchanged, the circuitry of diode network 137 is not affected during the next word period.

The circuitry corresponding to a particular count of program counter 105 is made effective in accordance with the states of the flip-flop N1 through N9. The arrangement adopted by the program counter is defined by trigger logical equations for each of the grids of flip-flops N1 through N9 in accordance with the various functions to be performed. The flip-flops are interconnected by a logical counting network causing them to operate as a binary counter whose outputs indicate PC#'s, as taught in the prior art. Since flip-flop N*d* is controlled in turn by circuitry of arithmetic unit 103, it is apparent that mutual control occurs between program counter 105 and arithmetic unit 103.

It has been pointed out that all memory heads supply information to gating unit 104. More specifically, the outputs from the 100 memory heads are fed simultaneously into gating unit 104 where only one of such outputs is selected at a time in accordance with signals from arithmetic unit 103 received over gate input line 127. The selected head output is transmitted from gating unit 104 via gate output line 128 to arithmetic unit 103 wherein memory read flip-flop M*c* is caused to respond thereto. The action will be made apparent by reference to Figs. 6 through 10 in conjunction with Fig. 1. A set of flip-flops (U9 to U12) in arithmetic unit 103 is arranged to function as channel selector register 142, and another set (U13 to U16), also in arithmetic unit 103, is arranged to function as a head selector register 143 during the time that the memory is being searched. Both of these selectors, 142 and 143, cooperate to send a selective signal through gate input line 127 to gating unit 104. This signal causes gating unit 104 to pass information from only one head through gate output line 128 to flip-flop M*c* in arithmetic unit 103. Referring to Fig. 8, a table shows the contents of the channel selector flip-flops which defines the outputs for each of the memory channels; while Fig. 7 shows a diode matrix which reduces these defined outputs to physical circuitry. Similarly, Fig. 10 is a table showing the contents of the head selector flip-flops which characterizes the outputs for each of the heads of a memory channel, whereas Fig. 9 shows a diode matrix which reduces these defined outputs to physical circuitry as well as combining them with the outputs of Fig. 7 to produce combination outputs representing the selection of a particular head on a particular memory channel.

Thus note that output Ch0 in Fig. 7 is connected to a common line 168 to which inputs designated $U_9'$, $U_{10}'$, $U_{11}$, and $U_{12}$ are connected by diodes, such as diode 169. A +225 v. source is also connected to common line 168 through a load resistor 170. The operation of this circuit is such that only when all of the inputs to common line 168 are at the high potential of +125 v. that the output Ch0 is at substantially this same high potential. The matrix of Fig. 9 operates in a similar manner. Each of the inputs to common line 168 can have either a high potential of +125 v. or a low potential of +100 v. Thus, only one of the output lines from the diode matrix shown in Fig. 9, such as Ch0 Hd0, will be at the effective potential of +125 v. D.C. at any one time while all other output lines (Ch0 Hd1, Ch0 Hd2 . . . Ch9 Hd9) will be at the ineffective potential of +100 v. D.C. It will be noted that all the diode networks in the computer are operated at the same potentials as the diode matrices of Figs. 7 and 9, namely, +225 v. D.C. and ground. It will be noted that the matrices of Figs. 7 and 9 are composed of a plurality of diode gating circuits, hereinafter to be discussed in detail.

Fig. 6 details the circuitry in gating unit 104 for routing information between memory channels 113 and arithmetic unit 103, showing in particular a cross-section of drum 101 at channel Ch0. With reference to Hd0, coil 135, in which is induced electrical pulses as the substantially square magnetic saturation pattern on Ch0 moves past Hd0, is connected at one end to the control grid of tube 134 and at the other end to line 127 and thence to Ch0 Hd0 of Fig. 9. The cathode of tube 134 is maintained at +115 v. D.C. and it is necessary that the control grid bias be more positive than this value in order for tube 134 to conduct and provide an output corresponding to the electrical pulses induced in coil 135. Thus, only when the selector registers 142 and 143 comprised of flip-flops U9—U12 and U13—U16, respectively, are arranged so that Ch0 Hd0 is at the effective potential of +125 v. D.C. will tube 134 conduct. It will be noted that when Ch0 Hd0 is effective, Ch0 Hd1, Ch0 Hd2 . . . Ch9 Hd9 are at the ineffective potential of +100 v. D.C.; however, all of these points are connected to gating unit 104 via line 127 (Fig. 1). As shown in Fig. 6, the output of all the gating tubes is present at common junction 136, although, as indicated, the output of only one tube at a time is effective. As already outlined previously in connection with the arc address channel, for example, pulses appearing at junction 136 are amplified, clipped, clamped between the limits +100 v. D.C. and +125 v. D.C., by means indicated generally by the block 128*a* in Fig. 6, and applied as grid inputs to memory read flip-flop M*c* in synchronism with clock proposition C.

As shown in Fig. 1, output signals from clock line 126, clock counter 102, program counter 105, gating unit 104, arc address line 133, and the read heads of recirculating registers H and G are fed into arithmetic unit 103. More specifically, arithmetic unit 103 may be simultaneously receiving corresponding digits of words recorded in one of the storage registers of a memory channel and the digits of words in the H and G recirculating registers. It is the function of arithmetic unit 103 to manipulate this information to obtain a computational result which is either used for control or for recording into one of the registers on the drum.

Reference to Fig. 11 will now be made to describe how the circuitry of the computer serves to effectively interconnect the flip-flop circuits of the arithmetic unit in order to carry out the above function. Here, for instance, is shown diode network 137, which for convenience has been arranged as a component within arithmetic unit 103. In the computer, however, the arrangement is otherwise in that diode network 137 cannot be regarded as one integral component. Actually, it pervades all computer components, in that portions thereof are found in practically all other components. In other words, connections such as lines 138, 139, and 140 of Fig. 11 actually are made through portions of diode network 137, thus enabling program counter 105 to properly set up this diode network to cause components to properly carry out a predetermined computational sequence.

In Fig. 11, it is seen that arithmetic unit 103 receives information from drum 101, mixes and alters this information in accordance with a program specified by program counter 105, and either records this altered information or utilizes it for control purposes. As shown, it is diode network 137, the configuration of which is controlled by program counter 105, which operates in response to the terms generated by the several flip-flops and matrices to generate output propositions $H_0$ and $G_0$, the former of which is stepped into flip-flop H2 to be recirculated in the H recirculating register as the address of the storage register in the main memory to be communicated with, and the latter of which is stepped into flip-flop G2 to be recirculated in the G recirculating register as the contents of the storage register selected. For instance, if program counter 105 has set diode network 137 for normal recirculation, the outputs of flip-flops H1 and G1 will not be modified and thus will provide inputs to flip-flops H2 and G2, respectively. In other words, propositions $H_0$ and $G_0$ are identical to the outputs from flip-flops H1 and G1, respectively. However, for some other computer routines, propositions $H_0$ and $G_0$ may be functions of the output of flip-flop M*c* as well. The output proposition represented by line 127 carries the selective signal identifying a memory head as outlined in connection with Fig. 6. The cycle of 44 clock pulses (one word period) is determined by clock counter 102 and clock proposition C feeding into the left of diode network 137. As mentioned, these components operate to break up the period of a word so as to render certain circuits effective only during portions of a word. The operation of other components of arithmetic unit 103 is reserved for discussion hereinafter.

A broad outline of the sequence of operation of the computer for the look-up process will next be presented by reference to Fig. 11. Assume first that the programmer (computer operator) had previously recorded a word of information into one of the storage registers of a memory channel and knows the address thereof (i.e., the arc address and the channel address). Secondly, it is assumed that the program counter 105 is controlling the computer for operation such that the H recirculating register and the G recirculating register are set for recirculation by arithmetic unit 103. Thirdly, assume that all computer components are in synchronism as directed by clock counter 102. The programmer desires that information in the selected storage register be routed into the G recirculating register and stored therein for future use. The address of the storage register desired is placed in the H recirculating register where it recirculates in synchronism with the $m_2$ portion of the arc address channel as illustrated in Fig. 5. All subsequent action involved in the look-up process is automatically accomplished by the computer and is completed in a time interval equivalent to at most 12 word periods. The action of the program counter 105 in automatically carrying out this look-up sequence, comprises the following: In arithmetic unit 103, a binary-coded excess 3 numeral corresponding to the proper memory channel specified in the $m_2{}^c$ portion of the H recirculating register is set up in channel selector register 142, thereby causing the appropriate memory channel line of selector matrix 144 (Figs. 7 and 9) to be high. During the same word period, the arc addresses, as read into the W*c* flip-flop, are operated upon in conjunction with the $m_2{}^a$ portion of the H recirculating register, as it appears in the H1 flip-flop, resulting in the stepping of a binary-coded excess 3 numeral corresponding to the proper memory head into head selector register 143, thereby causing the appropriate memory head line of selector matrix 144 to be high. Thus selector matrix 144 is arranged to connect the proper head through gating unit 104 to flip-flop M*c*. Simultaneously with this action, decimal units, or D4 portion of the arc addresses, as read into the W*c* flip-flop from the arc address channel 114 on the drum, are being compared with the $m_2{}^a$ portion of the H recirulating register; and flip-flop N*d* is triggered false if at least one pair of the corresponding binary digits of each are unequal, thus causing program counter 105 to repeat the look-up sequence, i.e., remain unchanged. However, if there are no inequalities, flip-flop N*d* is not triggered (i.e., it remains true) and program counter 106 counts, causing a one word period delay, after which diode network 137 is arranged to cause proposition $G_0$ to follow the output of flip-flop M*c*. Thus the content of the desired arc is withdrawn and routed into the G recirculating register.

Before considering the features of the computer circuitry concerned with the present invention, the convention of the logical methods employed herein, as well as some typical arithmetic techniques, will first be broadly outlined.

Logical propositions may be considered to be represented in circuitry by the states assumed by bistable state circuits having two input lines and two output lines. The arrangement of such a bistable state circuit as used in the present invention will be explained by reference to Fig. 12. This circuit is designated as flip-flop K3 and its function in the circuitry of the present invention will be described hereinafter. This flop-flop circuit utilizes a pair of triode tubes such as tube 129 and tube 130. When a flip-flop is in the condition such that tube 130 is cut off and tube 129 is conducting, it is considered to be "true" (or the flip-flop is said to be storing a binary "1"). When the flip-flop is in its other condition wherein tube 130 is conducting and tube 129 is cut off, it is considered to be "false" (or the flip-flop is said to be storing a binary "0"). Regardless of the state of the flip-flop, it will generate two terms, one high and the other low.

These terms are represented by the flip-flop output lines which are connected to the plates of the tubes and which are shown clamped at two operating potentials, +125 v. D.C. and +100 v. D.C. by diodes such as diodes 152 and 153 connected to the output line of tube 130. When the flip-flop is in a true state, the output line connected to tube 130 is at +125 v. D.C. while the output line connected to tube 129 is at +100 v. D.C. Similarly, when the flip-flop is in a false state, the output line connected to tube 129 is at +125 v. D.C., and the output line connected to tube 130 is at +100 v. D.C. In order to trigger the flip-flop, signals in the form of negative-going pulses are applied thereto on separate input lines coupled to the grid of each of the flip-flop tubes in accordance with the convention that the grid of tube 130 must be pulsed in order to trigger the flip-flop into its true state, and that the grid of tube 129 must be pulsed in order to trigger the flip-flop into its false state.

The nomenclature employed herein uses the combination of a capital letter followed by a numeral or small case letter for designating a proposition flip-flop (K3, B1, N*d*, etc.). The output of the flip-flop which is at the high D.C. voltage (+125 v.) when the proposition is true is characterized by the corresponding capital letter with the numeral or small case letter as a subscript ($K_3$, $B_1$, $N_d$, etc.); and the output which is at the high D.C. voltage when the proposition is false is similarly characterized except that a prime is affixed ($K_3'$, $B_1'$, $N_d'$, etc.). The true input of the flip-flop, i.e., the one which, when energized, renders the proposition true, is characterized by the corresponding small case letter with the associated numeral or small case letter as a subscript ($k_3$, $b_1$, $n_d$, etc.); the false input, i.e., the one which, when energized, renders the proposition false, is characterized similarly except that a subscript zero is prefixed (${}_0k_3$, ${}_0b_1$, ${}_0n_d$, etc.).

Describing the K3 flip-flop arrangement of Fig. 12 in greater detail, as shown, triodes 129 and 130 are arranged such that the plate of each is intercoupled to the grid of the other by a resistor in parallel with a capacitor, such as resistor 145 and capacitor 146. Each plate is provided with a separate load resistor, such as resistor 147, prior to connection to +225 v. D.C.; each grid is provided with a separate grid resistor, such as resistor 148, prior to connection to −300 v. D.C. bias; and each cathode is grounded. The input to the grid of triodes 129 and 130 is from gating circuits 131 and 132, respectively. The gate outputs are differentiated and clipped, as for instance by differentiating circuit 149 and diode 150 associated with the grid of triode 129, such that negative pulses only are applied to the grids. The output from each triode is from the plate and is clamped between +100 v. D.C. and +125 v. D.C. by crystal diodes, as for example diodes 152 and 153 connected to the plate output of triode 130.

As previously pointed out, the flip-flop circuit is triggered into its opposite state by applying a negative pulse to the grid of the conducting tube. If, for instance, the term $K_3$ is to be effective, it is necessary that the plate of triode 130 be high in potential. For this condition to attain, triode 130 must be cut off. Thus it is necessary to apply a negative pulse to the grid of triode 130 by providing an output from gate 132 (i.e., all of the terms $D_6P_0$, $K_1$, PC#6, and C must be simultaneously high). At the end of the pulse period, clock proposition C will become low and the trailing edge of the clock pulse, after differentiation, will produce the requisite negative-going pulse. It follows that flip-flop K3 will enter pulse position $D_6P_1$ in a true state. It should be noted that if flip-flop K3 were already true during $D_6P_0$, triode 130 would already be cut off and the negative pulse supplied by gate 132 would have no effect. In this case, the only way to change the state of flip-flop K3 would be to pulse the grid of triode 129 by providing an output from gate 131.

For the presentation of other flip-flop circuits, resort will be made to block diagrams to represent the schematic form, as illustrated by Fig. 13 for flip-flop K3, and the logical equations which define when and how the flip-flop circuit is to change will be shown below the block diagram. It will be noted that for simplicity the program counter terms effective for the $k_3$ and ${}_0k_3$ equations used as illustrative of nomenclature have been omitted.

The action of flip-flop K3 will be further explained by the waveforms of Fig. 14. These graphs show how flip-flop K3 is triggered true from a prior false condition at the end of the time $D_6P_0$. Line I represents the clock proposition C. It will be noted that a clock period is measured from the trailing edge of one clock pulse to the trailing edge of the succeeding clock pulse. Lines II and III show the states of the pulse counter 124 and digit counter 125, respectively, which together define the period $D_6P_0$ during which diode network 137 is arranged by program counter 105 to make flip-flop K3 responsive to clock proposition trigger pulses which will take effect provided flip-flop K1 is true. It is seen that only during the latter half of the $D_6P_0$ pulse period is the clock proposition C high. In line IV, flip-flop K1 is shown to be false except during the $D_6P_0$ period. It is thus during the latter half of the $D_6P_0$ pulse period that an effective true input $k_3$ in line V will be generated. However, flip-flop K3 will be triggered true only by a negative-going pulse applied to its true grid. This pulse occurs, as shown in line VI, when the $k_3$ input sharply drops to the low potential at the end of $D_6P_0$. The small positive-going pulse at the beginning of the second half of $D_6P_0$ has no effect on flip-flop K3 since tube 130 (Fig. 12) is already saturated. Thus, as line VII shows, the output $K_3$ swings to a high potential at the beginning of period $D_6P_1$ and flip-flop K3 will remain in the true state until triggered false at the end of a subsequent $D_6P_0$ period.

As previously stated, the computer logical operations are represented in the form of logical equations using the notation of Boolean algebra. A logical equation for the grid triggering of a flip-flop circuit consists of stating the terms which have to be effective, i.e., of a high potential during a clock period, in order that the flip-flop circuit will trigger into a particular state at the end of the clock period. Two operations are used in forming the equations. The first, "logical multiplication," means that all the terms in the particular product have to be of a high potential in order to make that product effective in a particular equation, and is accomplished in a circuit known as a "gate." The second, "logical addition," means that at least one term of the sum has to be of a high potential in order to make that sum effective in a particular equation, and is accomplished in a circuit known as a "mixer." Logical gates and mixers will next be described by reference to Fig. 26, which shows flip-flop N*d*, its triggering equations and circuitry.

Thus, for example, the equation:

$${}_0n_d=D_4(W_c'H_1+W_cH_1')C$$

is interpreted as meaning that the N*d* flip-flop will be triggered into the false state at the end of the clock period C during which the terms $$D_4 \text{ and } (W_c'H_1+W_cH_1')$$

are at a high potential, where $$(W_c'H_1+W_cH_1')$$

itself will be of a high potential whenever both the terms $W_c'$ and $H_1$, or both the terms $W_c$ and $H_1'$ are simultaneously of a high potential.

Fig. 26 also shows the logical networks, namely, product networks or "and" networks, such as 156, which are used to generate the trigger equations for flip-flop N*d*. Product network 156 is comprised of a pair of input crystal diodes 157 and 158 joined to a common junction 159 connected through a resistor 160 to the positive potential source of 225 v. These diodes are orientated such that whenever the input signals on both diodes are at the high potential of +125 v., the output 161, connected to common junction 159, is at the high potential of +125 v. Any time one or both of the diode inputs have the low signal potential of +100 v. thereon, output 161 is at this low signal potential.

Output 161, it is seen, comprises one input to a logical sum network 162. This sum network or "or" network is comprised of a pair of input crystal diodes 163 and 164 joined to a common junction 165 which is returned to ground through resistor 166. These diodes are orientated so that whenever the signal on either one of the inputs is at the high potential of +125 v., the output 167 of the sum circuit, connected to the common junction 165, is at the high potential of +125 v. When neither of the inputs is high in potential, the output 167 is at the low potential of +100 v.

Referring again to Fig. 11, here it is indicated by block 154 that a series of flip-flops, A13 through A16 and flip-flop K1, are arranged as an arithmetic adder during $D_{4-5}$ which receives outputs from flip-flops $W_c$ and H1. Adder flip-flops A13—A16 receive simultaneously only a single pair of equal-order binary digits of the addend, as represented by the signals on output $W_c'$ (complement of $W_c$) of the $W_c$ flip-flop, and the augend, as represented by signals on output $H_1$ of the H1 flip-flop. At the end of a clock pulse the least significant (lowest order) digits of each numeral are added and the digits of the sum are set up in flip-flop A13 while the carry is manifested by the state of flip-flop K1, true for a carry and false for no carry. At the end of the next clock pulse period, this sum digit is transferred to flip-flop A14; and the sum of the following digits of each numeral, together with the carry in flip-flop K1, are set up in the A13 flip-flop. The addition process is continued until the eight binary digits of both numerals occurring during $D_{4-5}$ have been added such that the sum is contained in adder flip-flops A13—A16 with the most significant binary digit in flip-flop A13 and the fourth most significant binary digit in flip-flop A16 and a possible carry is held in flip-flop K1. Thus, eight clock pulse periods are required to add the two four-place binary numerals $W_c'$ and $H_1$.

As noted further in Fig. 11, within the dashed block 155, the A13—A16 flip-flops are again shown similarly arranged during $D_6$ as a fixup adder along with the K2 flip-flop operating as a carry generator. Thus, as is well known in the prior art, in order to serially add two binary-coded excess 3 numerals, two addition processes are resorted to.

Reference to Figs. 15, 16, 17, 18, and 19 will serve to further illustrate the operation of the A13—A16 flip-flop circuits. In Fig. 15 is presented a block diagram of flip-flops A13—A16 with the logical equations governing their operation set forth below in accordance with the convention already outlined. From the block diagram it is seen that each of these flip-flops is triggered by a clock pulse provided that during the clock period one of the two grid gates is open, i.e., that the grid equation is effective. For instance, flip-flop A14 will be triggered true by the trailing edge of a clock pulse which occurs when the output $A_{13}$ of flip-flop A13 is high: $a_{14}=A_{13}C$. Similarly, flip-flop A14 will be triggered false by the trailing edge of a clock pulse which occurs when the output $A_{13}'$ of flip-flop A13 is high: ${}_0a_{14}=A_{13}'C$. In other words, these equations state that the status of flip-flop A14 follows that of flip-flop A13, that is, the content of flip-flop A13 is stepped into flip-flop A14 on successive clock pulses. The equations for flip-flops A15 and A16 complete the flow of information from flip-flop A13 to flip-flop A16 during two additional clock pulse periods. It is seen that information stepped into flip-flops A14, A15, and A16 comes from the preceding flip-flop of the group, that the adder register can be entered from an external source only via the grid gates of flip-flop A13, and that information can be obtained from the register only from the plates of flip-flop A16.

The nature of the information set up in flip-flop A13 will now be discussed by reference to the $D_{4-5}$ term of the flip-flop A13 equation in Fig. 15 and to the $D_{4-5}$ table in Fig. 16. During the $D_{4-5}$ period, the adder register is arranged by program counter 105 such that input to flip-flop A13 is from four different sources: clock proposition C, and flip-flops Wc, H1, and K1. The truth table of Fig. 16 shows the possible states of the three latter sources and indicates that the differentiated pulse derived from the trailing edge of a clock pulse will trigger flip-flop A13 true for the states of lines I, IV, VI, and VII of the table. This is symbolically represented by the $a_{13}$ equation shown below the table of Fig. 16. Similarly the differentiated pulse derived from the trailing edge of a clock pulse will trigger flip-flop A13 false for the states of lines II, III, V, and VIII of the table. This is symbolically represented by the $_0a_{13}$ equation shown below the table of Fig. 16. For example, line VI of the table shows that flip-flop A13 is triggered true by the trailing edge of a clock pulse which occurs when the terms $W_c$, $H_1'$, and $K_1$ are high, which is symbolically represented as: $a_{13}=W_cH_1'K_1C$. It will be further noted on line VI, for example, that since this addition does not produce a carry, and since the carry flip-flop K1 previously was storing a carry, flip-flop K1 must be triggered false at the end of this clock pulse period: $_0k_1=W_cH_1'C$. It is in this way that the equations for enabling flip-flop A13 to function as an adder during $D_{4-5}$ are derived.

As previously indicated in Fig. 11 by means of the dashed block 155, flip-flops A13—A16, after employment in the adder register during $D_{4-5}$, are used, in conjunction with flip-flops K2 and K3, as a fixup adder register during $D_6$. It has been pointed out that addend $W_c'$ and augend $H_1$ are both binary-coded excess 3 numerals. It is well known that the addition of two excess 3 numerals produces an excess 6 sum. Here the sum contained in fixup adder flip-flops A13—A16 is a binary-coded excess 6 numeral representing the next memory head to be passed by the desired arc and must be converted to excess 3 form for proper manipulation by the computer. This conversion is accomplished by the fixup adder register which receives the excess 6 numeral and performs a computation therewith, thus converting it to the excess 3 form. This computation effectively comprises an addition with the excess 6 numeral as augend and one of two fixup numerals as addend. The choice of fixup addend is determined by the state of adder carry flip-flop K1 at time $D_6P_0$ and the selected fixup addend is formed during the time from $D_6P_1$ to $D_6P_3$ by fixup carry flip-flop K2 and fixup decision flip-flop K3.

The logical equations defining the trigger inputs for flip-flop A13 and the carry flip-flop K2 to perform this fixup addition are obtained from the tables shown in Figs. 17 and 18 in a manner analogous to that described in connection with Fig. 16. The composite trigger input equation for the A13 flip-flop, taking into account both adding processes, is shown in Fig. 15, and the circuitry which generates the triggering equations for flip-flops A13 to A16 is shown in Fig. 19. The block diagram of carry flip-flop K1 and the circuitry for generating its trigger equations are shown in Fig. 20. Similarly, the block diagram of flip-flop K2 and the circuitry for generating its trigger equations are shown in Fig. 21. The nature of these equations will be explained in detail in the ensuing description.

Reference will next be made to Fig. 22, which is a portion of the computer flow diagram relevant to the look-up process of the present invention. Fig. 22 shows how the step operations rendered effective by program counter 105 are arranged to search the drum memory for a particular address specified in the H recirculating register, withdraw the information contained therein, and transfer this information to the G recirculating register for use in subsequent operations. As already pointed out, all sequential one-word-period steps into which computer processes are divided by program counter 105 are characterized by the effectuating of particular circuitry. Each such step is represented in the flow diagram by a block identified by a number, such as PC#6, and diagrammatically stands for a set of logical operations to be serially performed by diode network 137 on information passing through arithmetic unit 103 during the particular word period. There is a PC# to correspond to each of the output signals generated by the program counter register N1—N9 already described, and a different PC# is assigned to each configuration although it may be identical to other prior or subsequent configurations. It follows that the look-up process embodied in PC#6 of Fig. 22 is repeated numerous times in the complete computer flow diagram although a different PC# may be assigned it each time.

A broad outline of the sequence of operation of the computer look-up process has already been given. There it was assumed that the programmer had previously recorded a word of information into one of the storage registers of a memory channel. It should be understood that the look-up process was employed to do this and thus it follows that the look-up process is essentially the same for recording information into the memory as for withdrawing information therefrom, i.e., the sequence of PC#6 is relevant to recording as well as to reading. Initially, when the computer had been energized, the program counter output provided for an idle operating condition, PC#0; and, after the word is recorded, the computer returns to and remains in, i.e., continuously repeats the sequence of operation of PC#0. When the programmer records the address of the storage register containing the word into the H register, program counter 105 causes the computer to advance from PC#0 through a testing sequence, PC#1 to PC#5 (not relevant here), to PC#6 which defines the look-up process. In PC#6, as will be detailed, the memory is searched, the proper memory head identified and its output gated into gated unit 104, and thence to flip-flop Mc, which thus follows the head output. This condition is maintained for the additional word period of PC#7, employed as a delay to permit switching and other circuit transients to settle. During the following word period (PC#8), diode network 137 is arranged to transfer the output of flip-flop Mc into the G recirculating register.

As Fig. 22 indicates, within the rectangle representing each word time block, concise statements appear defining the activity during that word period. Below each of the blocks, logical equations are presented which define how the statements made within the rectangle are precisely stated in terms of the computer.

The computer operates on the $D_{4-5}$ portions of the address in the H recirculating register together with the arc addresses serially read into flip-flop Wc from the arc address channel during $D_{4-5}$ in order to set up the head selector register 143 in accordance with a binary-coded excess 3 numeral representing a memory head, and also to determine the word period during which the output of the selected head is gated through to arithmetic unit 103. Subsequently, the computer operates on the $D_6$ portion of the address in the H recirculating register in order to set up the channel selector register 142 so that the selected head on the proper memory channel will be gated through. The flow diagram of Fig. 22 clearly reveals how the main operations performed by the computer to perform the look-up operations are carried out during the word period that PC#6 is effective.

Since the H recirculating register contains the address of the storage register desired, it is set for recirculation as shown by equation $H_0=H_1$ so that this information will be made available to arithmetic unit 103 during each word period. The G recirculating register as yet contains no information, but is recirculated normally as shown by equation $G_0=G_1$ in readiness for information to be inserted therein by arithmetic unit 103. Referring momentarily to Fig. 11, this recirculation is accomplished for the H recirculating register by diode network 137 which connects term $H_1$ of flip-flop H1 directly to output $H_0$. In other words, diode network 137 is arranged by program counter 105 throughout the word period ($D_{0-10}$) to cause proposition $H_0$ to follow output $H_1$ of flip-flop H1. The logical equation for the G recirculating register is derived similarly. It will be noted that these equations are operative during the entire word period; and, where such is the case, the timing term $D_{0-10}$ will not be included. It will be also noted that, for simplicity, the PC# during which an equation is effective has been omitted from the equation, although the PC# appears as a logical multiplier in the appropriate diode networks.

The explanation of the operation of PC#6 will be continued by referring to Example 1 of Fig. 23 showing how the computer operates to select the next memory head, Hd5, of channel Ch0, at the instant that the arc address 23 is being read from the arc address channel 114 by head 115, so as to be able to read information from the storage register having an arc address 75, which latter address is stored in the H recirculating register.

Referring to the cross-section of drum 101 corresponding to channel Ch0, for example, the desired arc 75 is indicated as being at this instant between Hd5 and Hd6 and is approaching the former as drum 101 revolves. The cross-section of drum 101 corresponding to arc address channel 114 shows that, for the word period shown, head 115 is reading the numeral 23 into flip-flop Wc. The method by which the computer operates is to effectively subtract 23 from 75 to obtain the number 52 (difference). It follows that the digit "5" of this difference identifies Hd5 as being the next head to be passed by arc 75, whereas the digit "2" of this difference is ignored by the computer as being of no value to the process. From a practical standpoint, the subtraction is in effect performed in the computer, as shown by the table on the left of Fig. 23, by employing the false output $W_c'$ of flip-flop Wc as addend, yielding the 9's complement as is typical in a binary-coded excess 3 system, adding a decimal one thereto, and disregarding any carry-overs into the third place. Thus:

$$75-23=75+(99-23)+1=152$$

As stated above, only the digit "5" of the resulting sum is of any significance. More specifically, as shown by the table of Fig. 23, the binary-coded excess 3 numeral 01010110 (23) in arc address channel 114 is sensed by arc address head 115 and flip-flop Wc is caused to follow this binary pattern, producing a true output $W_c$ 01010110 (23) and a false output $W_c'$ 10101001 (76), the latter of which is the 9's complement and is one input to the adder circuit 154. Flip-flop K1, employed to contain any carry formed by the addition process, is set true initially (during $D_3$), thus effectively adding a decimal one to $W_c'$, converting it from the 9's complement to the 10's complement.

The $k_1$ and ${}_0k_1$ equations, as previously derived from the table of Fig. 16, indicate that flip-flop K1 acts as a carry flip-flop for the addition of $W_c'$ and $H_1$ and is set true if the values of both are high during a pulse position. Thus it will be noted by the table of Fig. 23 that since both $W_c'$ and $H_1$ contain eight binary digits, their sum will contain eight or nine binary digits. The least significant four digits of this sum are lost because the A13—A16 chain has a capacity of only four digits, but the carry they produced via flip-flop K1 is preserved and added in at $D_5P_0$.

It should be noted that, since the addition process completed during $D_{4-5}$ in the example of Fig. 23 was an addition of two binary-coded excess 3 numerals, $W_c'$ and $H_1$, the sum will be in an excess 6 form and must be reconverted to the excess 3 form employed in the computer. This is accomplished during $D_6$ by adding to the first sum one of two fixup numerals: 0011 or 1101, the choice determined by the state of flip-flop K1 at $D_6P_0$, i.e., the carry resulting from the addition of $W_c'$ and $H_1$. If flip-flop K1 (the carry flip-flop during the first summation) is true at $D_6P_0$, it is an indication that the sum of $W_c'$ and $H_1$ is a nine-place binary-coded excess 6 numeral of which only the five most significant binary digits have been preserved; if flip-flop K1 is false at $D_6P_0$, it is an indication that the sum of $W_c'$ and $H_1$ is an eight-place binary-coded excess 6 numeral of which only the four most significant binary digits have been preserved. As is well established, the conversion of the former to a binary-coded excess 3 notation requires that the fifth place be disregarded and a binary 3 (0011) be added to the remainder; while the conversion of the latter to excess 3 notation requires that a binary 13 (1101) be added to the sum and the fifth place of the corrected sum be disregarded. The present invention provides means to select and form the proper fixup numeral. It will be observed that, regardless of which fixup numeral is to be added to the uncorrected sum, its least significant binary digit is 1, which, during $D_6P_0$, must be added to the content of flip-flop A16 and the sum stepped into flip-flop A13. Since adding a binary 1 to a binary digit is equivalent to complementing it, the complement of the content of flip-flop A16 is stepped into flip-flop A13 and appears therein during $D_6P_1$. The content of flip-flop A13 during $D_6P_1$ is thus the least significant binary digit of the binary-coded excess 3 numeral (corrected sum) identifying the head which will next sense the information in the desired arc. It is now necessary during the period from $D_6P_2$ through $D_7P_0$ to add to the rest of the binary-coded excess 6 sum the remainder of the proper numeral, 001 or 110, which will be designated the fixup addend.

The scheme employed in the present invention to introduce during $D_6P_1$ to $D_6P_3$ the proper fixup addend is to select the proper output term from fixup decision flip-flop K3. As outlined in connection with the basic terminology in which the computer is described herein, flip-flop K3 presents two outputs, $K_3$ and $K_3'$. Thus, by setting flip-flop K3, in accordance with the carry flip-flop K1, at $D_6P_0$, program counter 105 arranges diode network 137 to select term $K_3$ during $D_6P_1$ and term $K_3'$ during $D_6P_{2\text{-}3}$. It is in this fashion that the fixup addend 001 is formed if flip-flop K3 is set true at the end of $D_6P_0$, as logically noted by equation $k_3=D_6P_0K_1C$; and the fixup addend 110 is formed if flip-flop K3 is set false at the end of $D_6P_0$, as logically noted by equation $${}_0k_3=D_6P_0K_1'C$$

It will be noted that the state of flip-flop K3 remains static until subsequently changed as a result of a change of state of flip-flop K1.

Since no addition was actually performed at $D_6P_0$ to form the least significant binary digit of the corrected sum, it is required that flip-flop K2 (the carry flip-flop) reflect into $D_6P_1$ any carry that would have been produced by an addition if actually performed during $D_6P_0$. In other words, flip-flop K2 simulates the carry which would have been produced had a fixup addition been made during $D_6P_0$. It follows that the state of flip-flop K2 during $D_6P_1$ must be the same as that of flip-flop A16 during $D_6P_0$. Since, as later shown, flip-flop K2 enters period $D_6$ false, the only triggering provision required is to the true condition, namely, $k_2=D_6P_0A_{16}C$.

The sum and carry equations during $D_6P_{2\text{-}3}$, which effectively add the fixup addend to the first sum, are derived from the table of Fig. 18, as previously described. For emphasis, it is repeated that this fixup addend is formed by sensing the appropriate output of flip-flop K3 during $D_6P_{2\text{-}3}$. These sum digits are set up in flip-flop A13 and stepped in order to flip-flops A14, A15 and A16, as described for the first addition. Thus by $D_7P_1$, the entire corrected sum corresponding to the selected head is contained in flip-flops A13—A16. Thus, referring to the example described in Fig. 23, the corrected sum obtained in flip-flops A13—A16 at the end of PC#6 is a binary coded decimal digit (1000) or Hd5.

This binary-coded excess 3 numeral in flip-flops A13—A16 which identifies the proper head to be gated is stepped into head selector register U13—U16 during $D_{10}$. This information is first stepped from the A16 flip-flop into the U13 flip-flop by circuitry defined by logical equations $u_{13}=D_{10}A_{16}C$ and $_0u_{13}=D_{10}A_{16}'C$. The contents of flip-flop U13 is then stepped in turn into flip-flops U14, U15, and U16 by circuitry as shown in Fig. 28.

As already shown in connection with Fig. 5, the content of the H recirculating register during the $D_6$ period identifies the channel address of the desired arc. This information is serially stepped during $D_6$ from flip-flop H1 into flip-flop U9, as logically defined by equations $u_9=D_6H_1C$ and $_0u_9=D_6H_1'C$, and then, in turn, stepped into the U10, U11, and U12 flip-flops, as logically defined by equations $u_{10}=U_9C$, $_0u_{10}=U_9'C$, etc. shown by the circuitry in Fig. 27.

Having shown how the head and channel selection have been set up so as to gate the proper head to the M*c* flip-flop, it will now be described in detail how the program counter 105 operates to enable the information being read into the M*c* flip-flop to be routed into the G recirculating register when the selected head is reading the particular storage register desired.

Thus the next equations to be described in detail in PC#6 are those which define the function of flip-flop N*d*, the block diagram, and the logical networks of the triggering equations of which are shown in Fig. 26. As previously noted, the function of flip-flop N*d* is to signal program counter 105 at the end of a word period to sequence the computer to count in an orderly fashion or to remain unchanged and thereby repeat the activity of the particular PC# under consideration. Thus, once flip-flop N*d* is set true at the beginning of PC#6 word period, as indicated by $n_d=D_0C$, it will thus be maintained unless subsequently triggered false. It consequently follows that unless this flip-flop is set false subsequent to its initially being set true, the computer will enter PC#7 at the end of the word period represented by PC#6.

The conditions under which flip-flop N*d* is set false, as indicated by equation $_0n_d=D_4(W_c'H_1+W_cH_1')C$, will next be described. It has already been pointed out in connection with Fig. 11 that arithmetic unit 103 simultaneously is receiving information synchronized by clock proposition C from several sources including the H recirculating register and the arc address channel on the drum. This information is utilized as it appears in flip-flops W*c* and H1. It has also been pointed out in connection with the broad outline of the sequence of operation of the computer for the look-up process that a comparison is made, digit by digit, of the arc addresses as read from the arc address channel with the desired arc address specified in the $m_2{}^a$ portion of the H recirculating register; and, if at least one of the corresponding binary digits of each are unequal, flip-flop N*d* is triggered false, thus causing program counter 105 to remain unchanged. In other words, the above equation states that the status of flip-flop N*d* at $D_{10}P_3$ reflects the success or failure of the comparison. Flip-flop N*d* is to be triggered false during $D_4$ at the end of a clock pulse if $W_c$ and $H_1$ were not both high or both low during the clock pulse, otherwise flip-flop N*d* is to remain true; but once flip-flop N*d* is triggered false, it remains false throughout the remainder of the word period.

Thus referring again to the cross-section of the drum showing channel Ch0 in Fig. 23, the desired arc 75 is between Hd5 and Hd6 and is approaching the former as drum 101 revolves. The cross-section of the drum showing arc address channel 114 indicates that flip-flop W*c* is sensing the numeral 23.

It follows that the address being read into flip-flop W*c* will be 25 when arc 74 is passing Hd5; or, in other words, the least significant decimal digit "5" as read into flip-flop W*c* identifies the least significant decimal digit of the addresses identifying the arcs in the main memory next to pass any of the memory heads. Thus the $_0n_d$ equation expresses a comparison between the least significant decimal digit as read into flip-flop W*c* and the least significant decimal digit of the desired arc address in the H recirculating register as stepped into flip-flop H1, and if these digits are the same, causes the computer to count out of PC#6 and reside in PC#7 for the next word period. The diode networks made effective during PC#7 function to route the output of flip-flop M*c* into the G recirculating register, thus completing the transference of information from the main memory of the drum to the arithmetic unit 103. It should be noted that it may take from 1 to 9 words periods to make the comparison test, depending on the location of the desired arc, with respect to the head which is to read the arc, at the time PC#6 is entered. Thus the contribution of PC#6 to the total access time for the look-up process cannot exceed 9 word periods in length.

A summary of the example in Fig. 23 will now be presented. At the instant that the computer enters PC#6, the cross-section of memory channel Ch0 shows that the memeory heads Hd0, Hd1, and Hd9 are all sensing arcs, the identifying numerals of which are all characterized by the fact that the last significant decimal digit thereof is "2," and that Hd0 is specifically sensing arc 22. Simultaneously, as will be observed from the cross-section of arc address channel 114, arc address head 115 is sensing the content of an arc with the numeral 23 encoded in the $D_{4-5}$ periods thereof. It follows that the true output term $W_c$ of arc address flip-flop W*c* will be as represented in line I in the table of Fig. 23, and the false output term $W_c'$ thereof will be as represented in line IV. It should be understood that the channel memory heads, and arc address head 115, are precisely aligned such that the information sensed by each occurs in the corresponding elemental memory areas of the ten arc lengths between successive heads of the channels. Presented to arithmetic unit 103 in synchronism with the foregoing is the desired arc address being recirculated in the H register; for this example, the desired arc is arc 75, shown encoded in lines II and III. It is repeated that during $D_4$ two actions occur:

The first action is the addition of $W_c'$ and $H_1$, which occurs during $D_4$ and $D_5$, producing a binary-coded excess 6 sum, the four most significant digits of which are preserved in flip-flop A13—A16 and shown in lines VI and VII. It will be remembered that the adder register has a capacity of four digits and thus the first four digits of the sum which are formed are lost. Line V shows the state of adder carry flip-flop K1 throughout the addition, and indicates that flip-flop K1 is true during $D_6P_0$, thus setting fixup decision flip-flop K3 true (line VIII). The process of correcting the binary-coded excess 6 sum to the excess 3 form commences at $D_6P_0$, at the end of which the least significant binary digit of the fixup augend (contained in flip-flop A16) is complemented and stepped into flip-flop A13, thereby becoming the least significant binary digit of the corrected sum, as shown in line X. Simultaneously, fixup adder carry flip-flop K2 is set true (line IX) to correspond to the state of the least significant binary digit of the fixup augend. At the end of $D_6P_1$ the second least significant binary digit of the fixup augend, outputs $K_3$ and $K_2$ are added, the sum appearing at $D_6P_2$ as the second least significant binary digit of the corrected sum. This process is repeated at $D_6P_{2\text{-}3}$ except that output $K_3'$ enters the addition and the two most significant binary digits of the corrected sum appear at $D_6P_3$ and $D_7P_0$. Flip-flop K2 is triggered false at $D_6P_3$. The corrected sum is now in the binary-coded excess 3 form and is stored in flip-flops A13—A16 until $D_{10}$, during which it is stepped into flip-flops U13—U16 of the head selector register 143. It can be seen on line X that Hd5 (1000) is identified by this example. It will be noted that the process, on repetition during the succeeding word period, will again result in identification of Hd5.

The second action during PC#6 is a comparison of $W_c$ and $H_1$ to set flip-flop N*d* and thereby cause program counter 105 to count or stick. As shown by lines I and II of Example 1 of Fig. 23, flip-flop N*d* will not be pulsed false from its initial true state (set during $D_0$) until $D_4P_1$. At this time the value of $W_c$ is high and that of $H_1$ is low and thus flip-flop N*d* will trigger false and remain so throughout the rest of the word period. Program counter 105 will be caused to stick and PC#6 will be repeated. It follows that another stick will occur during the following word period since, during $D_4$, $W_c$ content "4" will be compared with $H_1$ content "5." It also follows that flip-flop N*d* will remain true throughout the next word period when $W_c$ content "5" will match $H_1$ content "5" and, at the end of this word period, program counter 105 will count and sequence the computer into PC#7.

Fig. 24 shows a second example of head selection. The arc 50 of say channel Ch2 is desired and at the particular instant PC#6 is effective, this arc is approaching Hd8. The arc being read from the arc address channel by head 115 is 66. Thus:

$$50-66=50+(99-66)+1=84$$

As previously explained, only the digit "8" is important inasmuch as it represents the head numeral, i.e., Hd8. This head numeral is set up in the head selecting register 143, and the channel address Ch2 as found in the H recirculating register is set up in the channel selector register 142. Having thus gated the necessary head, the comparing process continues until the units digit "0" of the numeral 50, being recirculated in the H register, compares with the units digit of the numerals being read from the arc address channel, namely, 70. At this time the program counter counts out of PC#6, causing the output of M*c* to be read into the G recirculating register.

Fig. 25 shows a third example of head selection, wherein storage register having an arc address of 25 and a channel address of Ch5 is being sought. The arc being read from the arc address channel, when PC#6 is effective, is defined by numeral 76. Thus:

$$25-76=25+(99-76)+1=49$$

Thus the tens digit "4" specifies the head numeral Hd4. This example represents the case where the desired arc, 25, is passing a memory head, Hd5, at the instant that PC#6 is entered. The results of the computation identify head Hd4.

Since the numeral read from the arc address channel during this initial word period is 76, Hd4 is inhibited from feeding information via flip-flop M*c* into the G recirculating register until after the comparison test is made, which in this instant is 9 word periods later.

Computer activity subsequent to setting up head selector register U13—U16, in accordance with the identified memory head and channel selector register U9—U12 in accordance with the memory channel specified by the control number, will next be discussed with reference to Fig. 22.

PC#7, labelled "Delay," is entered. This represents a delay of one word period during which transient effects, mainly due to flip-flop triggering, are allowed to dissipate. As indicated by the status of flip-flop N*d*, the computer enters PC#8 after the one word period delay of PC#7.

It is during PC#8, designated "Read," that diode network 137 causes proposition $G_0$ to follow flip-flop M*c*, which is responding to the content of the desired storage register, thus routing the desired word for storage into the G recirculating register.

The presence of an apparent discrepancy is to be noted since PC#6 sets up the computer for reading the content of the desired arc during the following word period; and the operations in PC#7, which are effective for this word period, do not provide for such reading. Thus, it would seem that the content of the arc next following the desired arc would be read during PC#8. However, the complete computed flow diagram provides for a one-word-period delay each time the look-up sequence is conducted, i.e., each time that information is either inserted into or withdrawn from memory channels 113, thus cancelling the actual physical shift of the information in memory channels 113 with respect to arc address channel 114. For all practical purposes, this condition may be disregarded.

While the form of the invention shown and described herein is admirably adapted to fulfill the objects primarily stated, it is to be understood that it is not intended to confine the invention to the one form or embodiment disclosed herein, for it is susceptible of embodiment in various other forms.

What is claimed is:

1. A memory selecting system for a computer comprising a moving cyclical memory having a magnetizable periphery; an arc address channel on said memory; a flip-flop circuit provided with input means to be triggered in accordance with digital information signals sensed from said arc address channel; a recirculating register synchronized to advance with said memory for storing digital information signals identifying a particular arc on the periphery of said memory; a plurality of sensing means equally spaced around said memory, each of said sensing means capable of inserting information signals into or withdrawing information signals from any of the arcs; and means for effectively subtracting the digital signals being serially advanced in said recirculating register and the digital signals in said flip-flop circuit to obtain a signal identifying the particular sensing means next to be traversed by the particular arc.

2. A memory selecting system for a computer comprising a rotating memory having an arc address channel for defining successive arcs about the periphery thereof; a plurality of transducing means positioned about a storage information channel provided on said memory; pickoff means for responding to the signals on the arc address channel; a register for storing digital information signals representing the address of one of the arcs on the information channel; a first means for subtracting the signals sensed in said pickoff means from the information signals in said register to obtain a signal selecting the particular transducing means next to be traversed by the desired arc; and a second means for comparing a portion of the digital information signals in said pickoff means and said register to obtain a signal defining the instant said selected transducing means senses the desired arc.

3. A memory selecting system for a computer comprising a rotating memory having an arc address channel for defining successive arcs about the periphery thereof; a plurality of magnetic heads positioned about a storage information channel provided on said memory; pickoff means for responding to the signals on the arc address channel; a first register for storing digital information signals representing the address of one of the arcs on the information channel; a first means for subtracting the signals in said pickoff means from the signals in said first register to obtain a head identifying signal; a head selector register for storing said head identifying signal; a second means for comparing a portion of the digital signals sensed in said pickoff means and said first register; means for causing the operation of said comparing means to be repeated until signals sensed by said pickoff means compare with signals in said first register; a memory flip-flop circuit; and gating means selected by said head selector register to pass signals from one of said heads to said memory flip-flop circuit when said comparing means indicates a comparison is made.

4. A memory selecting system comprising a moving memory magnetizable along the direction of motion thereof with digital information signals in successive areas; generating means for successively generating signals identifying the successive areas of said memory; storage means for storing digital information signals identifying a particular area of said memory; a plurality of magnetic heads positioned along the memory such that the distance from one head to the next covers several of said areas; means responsive to the signals in said storage means and said generating means to determine the magnetic head next to be traversed by the particular area identified by the signals in said storage means; and means further responsive to the signals in said storage means and said generating means to determine the instant said magnetic head starts to traverse the particular area.

5. A memory selecting system for a computer comprising a rotating memory having an arc address channel for defining successive equal arcs about the periphery thereof; a plurality of transducing units positioned about a storage information channel provided on said memory such that the spacing from one transducing unit to the next corresponds to a plurality of said arcs; pickoff means for responding to the signals on the arc address channel; a register for storing digital information signals representing the address of one of the arcs on the information channel; a first means for subtracting the signals sensed by said pickoff means from the signals stored in said register to obtain a signal selecting the particular transducing unit next to be traversed by the desired arc; and a second means for comparing signals in said pickoff means and said register to obtain a signal defining the instant said selected transducing unit senses the desired arc.

6. A memory selecting system comprising a moving cyclical memory having a first channel about the periphery thereof for storing numerical signals a second channel about the periphery of said memory having signals defining successive arcs of said first channel; reading means cooperating with said memory to serially sense the signals of said second channel; a first recirculating register cooperating with said memory and having a cycle period corresponding to the period of an arc to store numerical signals representing the identification of a particular arc; a second recirculating register cooperating with said memory, similarly to said first recirculating register, and having an input; a plurality of magnetic heads equally spaced about the first channel of said memory; and means responsive to said reading means and the signals of said first recirculating register to generate a first and second signal, said first signal being operable to select the magnetic head of said first channel next to sense the signals in said particular arc, and said second signal being operable to interconnect said particular magnetic head to the input of said second recirculating register at the instant the head starts to sense the particular arc.

7. A memory selecting system comprising a rotating memory having a first channel about the periphery thereof for storing numerical signals a second channel about the periphery of said memory having numerical signals of said first channel defining successive arcs; reading means positioned to serially respond to the numerical signals of said second channel; a recirculating register cooperating with said memory to store numerical signals representing the identification of a particular arc; a plurality of magnetic heads equally spaced about said first channel on said memory; means for subtracting the numerical signals in said reading means from the numerical signals sensed in said recirculating register; other means for simultaneously comparing numerical signals in said recirculating register with numerical signals sensed in said reading means; and gating means responsive to said subtracting and comparing means to pass signals from the magnetic head next to be traversed by the arc of said first channel identified by the numerical signals in said recirculating register.

8. A memory selecting system for a computer comprising a moving cyclical memory magnetizable about the periphery thereof with digital information signals in equal arcs each uniquely identified by an address; an arc address channel on said memory for storing address signals; means for triggering a flip-flop circuit in accordance with the address signals sensed in said arc address channel; a recirculating register synchronized to advance with said memory for storing digital information signals identifying a particular arc on the periphery of said memory; a plurality of transducing means equally spaced around said memory, each of said transducing means capable of being used for inserting information into or withdrawing information from any of the arcs; means for serially performing an arithmetic subtraction between the digital signals in said flip-flop and the digital signals serially advanced in said recirculating register to obtain a signal corresponding to the particular transducing means next to be traversed by the particular arc; and a transducing means selecting register comprising a plurality of flip-flop circuits capable of adopting a configuration in accordance with the signal generated by said subtracting means.

9. In a digital computing system, a rotatable drum having a magnetizable periphery; means for rotating said drum; a plurality of information storage channels extending about the periphery of said drum, each of said channels identified by a numeral; a plurality of information storage arcs provided in each of said channels; an arc identifying channel extending about the periphery of said drum storing numerical signals defining the location of each of said arcs; a plurality of magnetic heads equally spaced along each of said information storage channels, each said magnetic head identified by a numeral; reading means responsive to the numerical signals in said arc identifying channel; a first recirculating register cooperating with said drum to store a numeral representing the channel and arc addresses of a particular information storage arc; a second recirculating register cooperating with said drum; adding circuits responsive to the numerical signals in said first recirculating register and the numerical signals in said reading means to generate a head-identifying numeral; a head selecting register comprising a plurality of flip-flop circuits capable of adopting a configuration in accordance with the head-identifying numeral generated by said adding circuits; a channel selecting register comprising a plurality of flip-flop circuits capable of adopting a configuration in accordance with the channel address stored in said first recirculating register; a first diode network having a plurality of outputs, one corresponding to each configuration characterizing said selector registers in combination; gating means connected to each of said heads, one corresponding to each of said first diode network outputs; and a second diode network to connect said second recirculating register to said gating means when said particular arc content is sensed by said particular head.

10. A memory selecting system for a computer comprising a cyclical memory having an arc address channel for defining successive arcs about the periphery thereof; a plurality of transducing means spaced about a storage information channel provided on said memory; pickoff means for responding to the signals on the arc address channel; a register synchronized to advance with said memory for storing digital information signals corresponding to the address of one of the arcs on the information channel; and means for effectively subtracting the digital signals sensed in said pickoff means from the digital signals in said register to obtain a signal identifying the particular transducing means next to be in a position to be traversed by the desired arc.

References Cited in the file of this patent

UNITED STATES PATENTS

| | | |
|---|---|---|
| 2,540,654 | Cohen et al. | Feb. 6, 1951 |
| 2,614,169 | Cohen | Oct. 14, 1952 |
| 2,679,638 | Bensky | May 25, 1954 |
| 2,680,239 | Daniels | June 1, 1954 |
| 2,692,728 | Strickler | Oct. 26, 1954 |
| 2,702,380 | Brustman | Feb. 15, 1955 |
| 2,721,990 | McNaney | Oct. 25, 1955 |